US009866153B2

United States Patent
Kusakawa

(10) Patent No.: US 9,866,153 B2
(45) Date of Patent: Jan. 9, 2018

(54) MOTOR-DRIVEN APPLIANCE

(71) Applicant: MAKITA CORPORATION, Anjo-shi, Aichi (JP)

(72) Inventor: Takuya Kusakawa, Anjo-shi (JP)

(73) Assignee: MAKITA CORPORATION, Anjo (JP)

( * ) Notice: Subject to any disclaimer, the term of this patent is extended or adjusted under 35 U.S.C. 154(b) by 706 days.

(21) Appl. No.: 14/340,030

(22) Filed: Jul. 24, 2014

(65) Prior Publication Data
US 2015/0042247 A1 Feb. 12, 2015

(30) Foreign Application Priority Data

Aug. 7, 2013 (JP) ................... 2013-164266

(51) Int. Cl.
*H02P 1/00* (2006.01)
*H02P 6/00* (2016.01)
*H02P 7/29* (2016.01)
*B25F 5/00* (2006.01)

(52) U.S. Cl.
CPC .............. *H02P 6/002* (2013.01); *B25F 5/00* (2013.01); *H02P 7/2913* (2013.01)

(58) Field of Classification Search
CPC .......... B24B 23/03; H01M 2010/4271; H01M 2010/4278; H02J 7/007; H02P 31/00
See application file for complete search history.

(56) References Cited

U.S. PATENT DOCUMENTS

| 4,574,226 A | 3/1986 | Binder | |
|---|---|---|---|
| 2007/0068480 A1* | 3/2007 | Wiker | B23Q 11/0092 123/198 D |
| 2009/0242226 A1* | 10/2009 | Tokunaga | B25F 5/001 173/178 |
| 2013/0187587 A1* | 7/2013 | Knight | H02P 6/16 318/400.37 |
| 2014/0015465 A1* | 1/2014 | Kaizo | G05F 1/66 318/504 |
| 2014/0042951 A1* | 2/2014 | Chen | H02P 31/00 318/689 |
| 2014/0045653 A1* | 2/2014 | Atsumi | B25F 5/001 477/115 |
| 2014/0265948 A1* | 9/2014 | Kaizo | H02J 7/0065 318/139 |
| 2015/0042254 A1* | 2/2015 | Kato | H02P 27/08 318/458 |
| 2016/0294312 A1* | 10/2016 | Tsumura | H02M 5/458 |

FOREIGN PATENT DOCUMENTS

JP    A-60-77694    5/1985

* cited by examiner

*Primary Examiner* — Shawki S Ismail
*Assistant Examiner* — Zoheb Imtiaz
(74) *Attorney, Agent, or Firm* — Oliff PLC

(57) ABSTRACT

A motor-driven appliance includes a motor and a control unit that controls a drive output to the motor. The control unit detects a state amount indicating an operational state of the motor to derive a fluctuation range of fluctuation in the state amount. The control unit detects whether the motor is in an unloaded state or in a loaded state, based on the derived fluctuation range to perform the drive output to the motor, based on the detected result.

17 Claims, 15 Drawing Sheets

MOTOR-DRIVEN APPLIANCE

CROSS-REFERENCE TO RELATED APPLICATIONS

This application claims the benefit of Japanese Patent Application No. 2013-164266 filed Aug. 7, 2013 in the Japan Patent Office, the disclosure of which is incorporated herein by reference.

BACKGROUND

The present invention relates to a motor-driven appliance operated by a motor as a driving source.

As a motor-driven appliance operated by a motor as a driving source such as an electric power tool or an electric work machine, such a motor-driven appliance is known that has a so-called soft no-load function, which suppresses the output of a motor under no load. In a motor-driven appliance having a soft no-load function, the motor rotates at a low speed under no load and increases its rotational speed to rotate at a high speed when a load is detected (see, for example, JP60-077694).

As described in JP60-077694, in a conventional soft no-load control, a threshold is set for the current flowing in the motor, and it is determined that an unloaded state has changed to a loaded state if the current value exceeds the threshold, to thereby increase the rotational speed of the motor.

SUMMARY

However, variation in the value (the absolute value) of the current flowing in the motor occurs even under the same load condition due to variation of individual products, variation in the power voltage (e.g., the battery voltage) of the motor, or the like. The current value also varies depending on the state of the load (e.g., the load size), and the like.

Therefore, it is difficult to accurately detect the loaded state and/or the unloaded state by a method of detecting the respective states based on a comparison result between the current value (the absolute value) and the threshold value.

In one aspect of the present invention, it is desirable to be able to accurately detect at least the loaded state (the state in which a load is applied) of the motor in a motor-driven appliance having a motor as a driving source.

A motor-driven appliance according to one aspect of the present invention includes a motor and a control unit that controls a drive output to the motor. The control unit includes a state amount detection unit, a fluctuation range derivation unit, a load presence/absence detection unit, and a drive output unit.

The state amount detection unit detects a state amount indicating an operational state of the motor. The fluctuation range derivation unit derives a fluctuation range of fluctuation in the state amount, based on the state amount detected by the state amount detection unit. The load presence/absence detection unit detects whether the motor is in an unloaded state or in a loaded state, based on the fluctuation range derived by the fluctuation range derivation unit. The drive output unit performs the drive output to the motor, based on the state detected by the load presence/absence detection unit.

With the motor-driven appliance so configured, it is possible to accurately detect at least the loaded state of the motor, since the unloaded state and the loaded state of the motor are detected based on the fluctuation range of the state amount of the motor.

The drive output unit may perform the drive output to the motor, based on the state detected by the load presence/absence detection unit, so that the number of rotations of the motor is larger in the loaded state than in the unloaded state. This can reduce wasteful power consumption by relatively suppressing the number of rotations in the unloaded state and can effectively operate the motor-driven appliance by relatively increasing the number of rotations in the loaded state.

The control unit may include a fluctuation occurrence determination unit, a number-of-fluctuation-detections counting unit, and a number-of-fluctuation-detections determination unit. The fluctuation occurrence determination unit determines, at each predetermined determination timing, whether the fluctuation range derived by the fluctuation range derivation unit is equal to or larger than a predetermined fluctuation occurrence detection threshold. The number-of-fluctuation-detections counting unit counts a number of fluctuation detections, which is a number of times the fluctuation range is determined by the fluctuation occurrence determination unit to be equal to or larger than the fluctuation occurrence detection threshold. The number-of-fluctuation-detections determination unit determines whether the number of fluctuation detections counted by the number-of-fluctuation-detections counting unit is equal to or larger than a predetermined number-of-fluctuation-detections threshold. The load presence/absence detection unit determines that the motor has been brought into the loaded state if the number of fluctuation detections is determined by the number-of-fluctuation-detections determination unit to be equal to or larger than the number-of-fluctuation-detections threshold.

With the motor-driven appliance so configured, the motor is determined to be in the loaded state if the number of times the fluctuation range of the state amount is determined to be equal to or larger than the fluctuation occurrence detection threshold has become equal to or larger than the number-of-fluctuation-detections threshold. Accordingly, erroneous detection of the loaded state can be suppressed, to thereby increase the accuracy of detection of the loaded state.

The control unit may further include a number-of-fluctuation-detections initialization unit. The number-of-fluctuation-detections initialization unit initializes the number of fluctuation detections counted by the number-of-fluctuation-detections counting unit to an initial value if a state in which the fluctuation range is not determined by the fluctuation occurrence determination unit to be equal to or larger than the fluctuation occurrence detection threshold has continued for a predetermined first determination time period.

By thus including the number-of-fluctuation-detections initialization unit, even in a case where, despite the motor being in the unloaded state, the number of fluctuation detections is increased due to a temporal or momentary occurrence of fluctuation in the state amount caused by, for example, noise or other factors, the number of fluctuation detections is cleared (initialized) if a state in which the fluctuation range is smaller than the threshold has since continued. Accordingly, erroneous determination of the loaded state due to an unintended (temporal or momentary) occurrence of fluctuation in the state amount in the unloaded state can be suppressed, to thereby further increase the accuracy of detection of the loaded state.

At least either the fluctuation occurrence detection threshold or the number-of-fluctuation-detections threshold may be a value set in advance or may be settable by performing a setting input. A threshold setting input unit may be provided that receives a setting input of at least either the fluctuation occurrence detection threshold or the number-of-fluctuation-detections threshold, and the control unit may include a threshold setting unit that sets the at least either the fluctuation occurrence detection threshold or the number-of-fluctuation-detections threshold inputted by the threshold setting input unit as the setting input value.

By thus making possible the setting input of at least either of the above thresholds via the threshold setting input unit, desired thresholds can be set according to the state, the use status, the use environment, or the like of the motor-driven appliance. The sensitivity of detection of the loaded state can also be changed as appropriate.

The threshold setting input unit may be configured to include at least either an operation input receiving unit that receives the setting input by operation input to an operation unit provided in the motor-driven appliance or a communication input receiving unit that receives the setting input by communication from an external device.

If the operation input receiving unit is included, the thresholds can be set by operation of the operation unit by the user, etc. of the motor-driven appliance. If the communication input receiving unit is included, the thresholds can be set by remote operation via the external device. Accordingly, the usability of the motor-driven appliance can be improved.

Further, at least either the fluctuation occurrence detection threshold or the number-of-fluctuation-detections threshold may be changed based on the voltage of a battery that supplies electric power to the motor. The above voltage of the battery is detected by a voltage detection unit. Even under an identical load condition, the operational state of the motor is different if the voltage of the battery is different. Thus, there is a possibility that the accuracy of detection of the loaded state may decrease depending on the voltage of the battery if the thresholds are fixed to fixed values.

Therefore, decrease in the accuracy of detection of the loaded state resulted from a change in the voltage of the battery can be suppressed by changing at least either of the thresholds based on the voltage of the battery.

The load presence/absence detection unit may determine that the motor has been brought into the loaded state if a state in which the fluctuation range derived by the fluctuation range derivation unit is equal to or smaller than a predetermined no-fluctuation threshold indicating no fluctuation in the state amount has continued for a predetermined second determination time period. If the state amount does not fluctuate despite the drive output to the motor being performed, there is a possibility that the motor may be rotating at an extremely low speed or may have been stopped due to an excessive load applied to the motor. Therefore, the loaded state can accurately be detected based on the fact that a state in which the state amount does not fluctuate has continued for a predetermined time period.

The drive output unit may perform, in the unloaded state, a drive output under no load for rotating the motor at a predetermined number of rotations under no load, and may perform, in the loaded state, a drive output under load for rotating the motor at a predetermined number of rotations under load that is larger than the number of rotations under no load.

In such a case, a number-of-rotations setting input unit may be provided that receives a setting input of at least either the number of rotations under no load or the number of rotations under load, and the control unit may further include a number-of-rotations setting unit. The number-of-rotations setting unit sets the at least either the number of rotations under no load or the number of rotations under load inputted by the number-of-rotations setting input unit as the setting input value.

By thus making possible the setting input of at least either the number of rotations under no load or the number of rotations under load via the number-of-rotations setting input unit, an appropriate number of rotations that matches the purpose of use of the motor-driven appliance, an appropriate number of rotations that can be easily used by the user, and the like can be set, to thereby improve the efficiency of use and the usability of the motor-driven appliance.

The number-of-rotations setting input unit may be configured to include at least either an operation input receiving unit that receives the setting input by operation input to an operation unit provided in the motor-driven appliance or a communication input receiving unit that receives the setting input by communication from an external device.

If the operation input receiving unit is included, the number of rotations can be set by operation of the operation unit by the user, etc. of the motor-driven appliance. If the communication input receiving unit is included, the number of rotations can be set by remote operation via the external device. Accordingly, the usability of the motor-driven appliance can further be improved.

Further, a selection input receiving unit may be provided that receives a selection input as to whether the drive output is to be changed or maintained as it is when the loaded state is changed to the unloaded state. In a case where a change to the unloaded state is detected after a change from the unloaded state to the loaded state has been detected by the load presence/absence detection unit, the selection input receiving unit receives a selection input as to whether the drive output to the motor by the drive output unit is to be changed from the drive output under load to the drive output under no load, or the drive output under load is to be maintained as it is. In the case where a change to the unloaded state is detected after a change from the unloaded state to the loaded state has been detected by the load presence/absence detection unit, the drive output unit may perform the drive output to the motor according to input received by the selection input receiving unit.

With the motor-driven appliance so configured, the user can select whether to return the drive output to the drive output under no load each time the motor is brought into the unloaded state, or to maintain the drive output under load even if the motor is brought into the unloaded state after the motor has been brought into the loaded state. Accordingly, the usability for the user can further be improved.

The selection input receiving unit may be configured to include at least either an operation input receiving unit that receives the selection input by operation input to an operation unit provided in the motor-driven appliance or a communication input receiving unit that receives the selection input by communication from an external device.

If the operation input receiving unit is included, the setting input can easily be performed by operation of the operation unit by the user, etc. of the motor-driven appliance. If the communication input receiving unit is included, the setting input can easily be performed by remote operation via the external device. Accordingly, the usability of the motor-driven appliance can further be improved.

The state amount detection unit may detect a current flowing in the motor as the state amount. In such a case, the fluctuation range derivation unit may derive an amplitude of the current detected by the state amount detection unit as the fluctuation range.

The current flowing in the motor can be detected relatively easily. The current flowing in the motor reflects the operational state of the motor relatively well, and the current and the amplitude thereof change between when the motor is loaded and unloaded. Therefore, detection of the unloaded state and the loaded state can easily and appropriately be performed by reference to the amplitude of the current flowing in the motor.

The motor-driven appliance may be configured to include an appliance element and a drive mechanism that reciprocatingly drives the appliance element by converting a rotation of the motor to a reciprocating movement and transmitting the reciprocating movement to the appliance element, in which the appliance element driven reciprocatingly is brought into contact with a workpiece to thereby enable processing of the workpiece.

In a motor-driven appliance configured to be able to process a workpiece by reciprocatingly driving an appliance element, the state amount of the motor often differs between when the appliance element moves forward and when it moves backward although it depends on the configuration of the appliance element and the state of the workpiece. Therefore, it is more effective to apply the present invention to such a motor-driven appliance.

BRIEF DESCRIPTION OF THE DRAWINGS

Preferred embodiments of the present invention will now be described with reference to the accompanying drawings, in which.

DETAILED DESCRIPTION OF THE PREFERRED EMBODIMENTS

The present invention should not be limited to specific devices, structures, or the like shown in the below-described embodiments, and various forms can be adopted within a scope not departing from the spirit of the present invention. For example, some parts of the configuration in the below-described embodiments may be replaced with a known configuration having a similar function, may be added to or replaced with the configurations in the other embodiments, or may be omitted as far as the problem can be solved. Also, more than one of the below-described embodiments may be combined as appropriate to configure the present invention.

First Embodiment (1) Entire Configuration of Electric Power Tool 1

Figure 1:
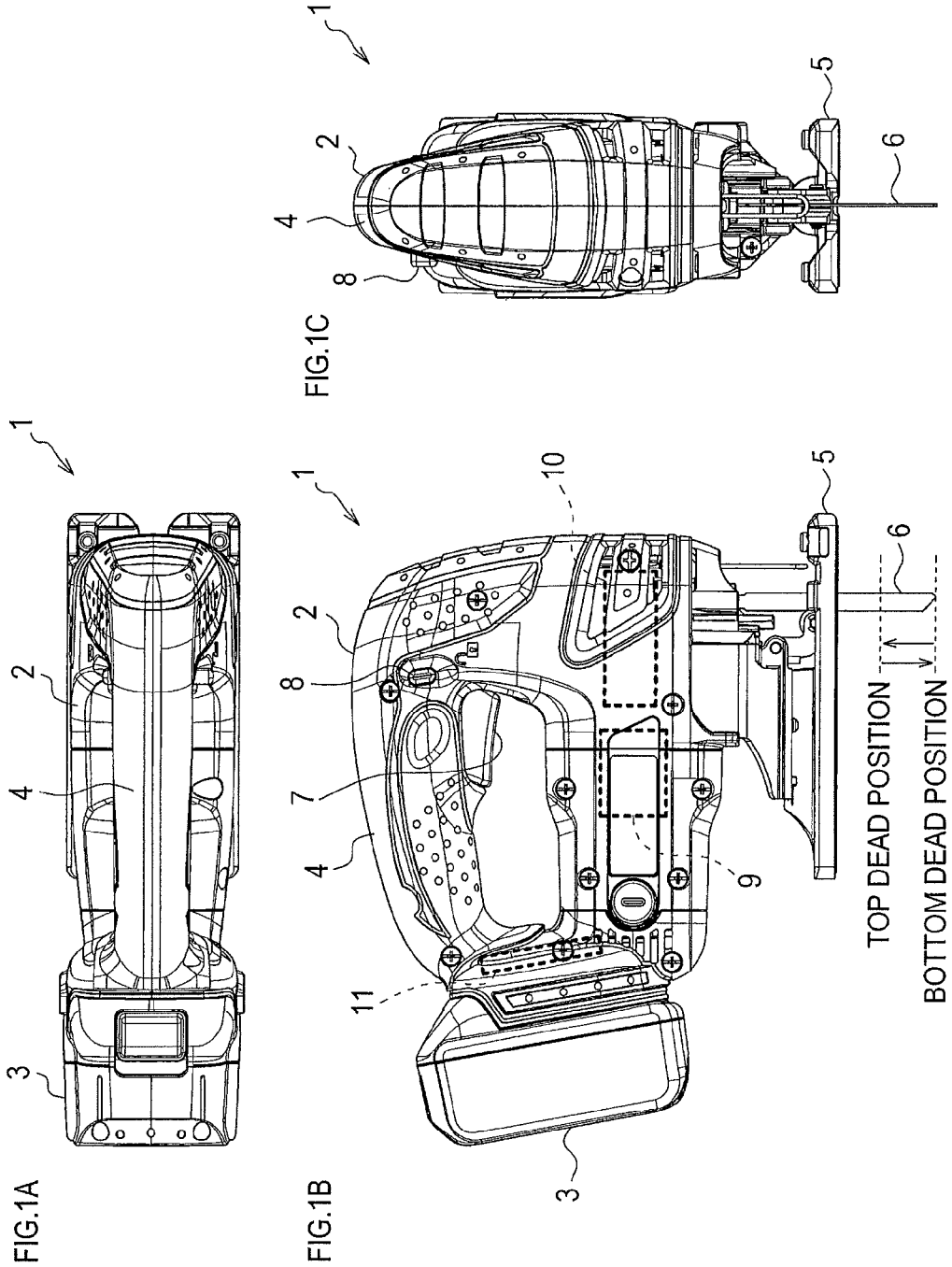
FIG. 1A is a plane view of an external appearance of an electric power tool 1 according to a first embodiment.
FIG. 1B is a side view thereof.
FIG. 1C is a front view thereof.

An electric power tool 1 as shown in FIGS. 1A to 1C is an example of a motor-driven appliance according to the present invention and is formed as a so-called jigsaw that cuts a workpiece made of material such as wood or metal.

The electric power tool 1 includes a tool body 2 and a battery 3. An end portion of the tool body 2 is configured to be detachably attached to the battery 3. FIGS. 1A to 1C illustrate a state in which the battery 3 is attached to the tool body 2.

The tool body 2 includes a grip portion 4, a base 5, a blade 6, a trigger 7, a lockoff button 8, a motor 9, a transmission mechanism 10, and a motor drive circuit 11. Among these, the motor 9, the transmission mechanism 10, and the motor drive circuit 11 are contained inside a housing of the tool body 2.

The grip portion 4 is a portion gripped by a hand of a user of the electric power tool 1. The base 5 is a flat plate-like member that enables a stable operation, including a cutting of a workpiece. By performing an operation including a cutting of a workpiece in a state in which the base 5 is in contact with an upper surface of the workpiece, the operation can be stable and efficient.

The blade 6 is a long, thin, plate-like metal member for cutting the workpiece, in which a jigsaw blade is formed on one of its side edges (the right side edge in FIG. 1B). The blade 6 is reciprocatingly moved in a vertical direction (in the vertical direction in FIGS. 1B and 1C) by a rotational force of the motor 9. In other words, the blade 6 is reciprocatingly driven between a top dead position and a bottom dead position as shown in FIG. 1B. The workpiece can be cut with the blade 6 by pushing the jigsaw blade side of the blade 6 against the workpiece while the blade 6 is reciprocatingly driven.

The trigger 7 is a switch to be operated by a user to operate the reciprocating drive of the blade 6. When the user pull-operates the trigger 7, a trigger switch 12 (omitted from FIGS. 1A-1C, see FIG. 2) is turned on to rotate the motor 9 to thereby operate (reciprocatingly drive) the blade 6. The lockoff button 8 is a button for permitting or prohibiting a pull operation of the trigger 7. The trigger cannot be pull-operated when the lockoff button is in a locked state and can be pull-operated when the lockoff button is in an unlocked state.

The motor 9 is rotated by electric power from the battery 3. The rotational force of the motor 9 is transmitted via the transmission mechanism 10 to the blade 6. The transmission mechanism 10 converts the rotational movement of the motor 9 to a linear movement to transmit the linear movement to the blade 6. The driving speed of the blade 6 and the number of rotations of the motor 9 are in an approximate linear relationship. Therefore, a larger number of rotations of the motor 9 leads to a larger driving speed of the blade 6. The number of rotations of the motor 9 means the number of rotations per unit time, e.g., the rotational speed (angular velocity).

The motor drive circuit 11 controls the rotational drive of the motor 9 and controls the reciprocating drive of the blade 6.

(2) Description of Electric Power Tool System

Figure 2:
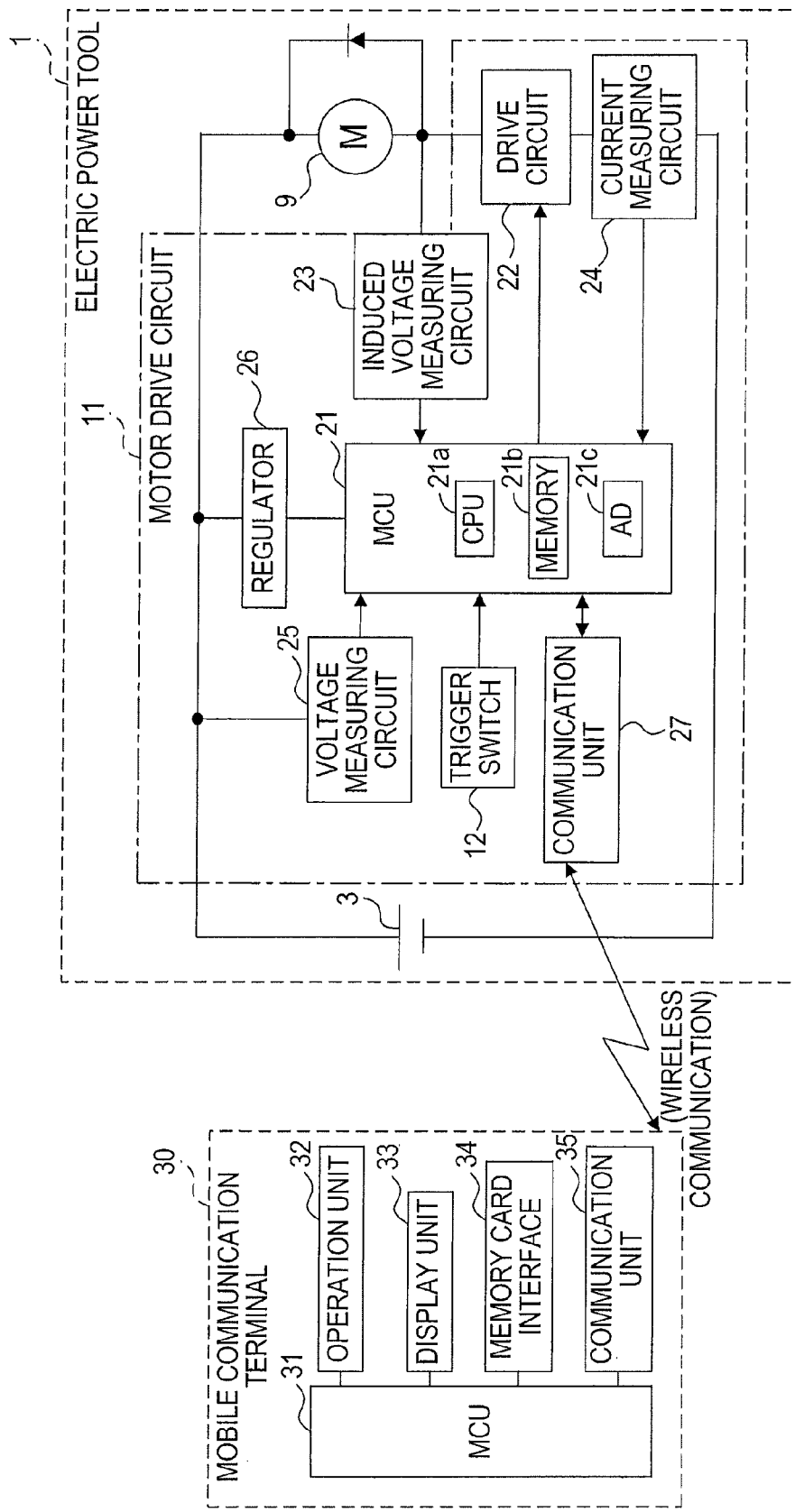
FIG. 2 is a block diagram showing an electrical configuration of an electric power tool system according to the first embodiment.

Next, an electric power tool system comprising the electric power tool 1 and a mobile communication terminal 30 will be described with reference to FIG. 2. Although the electric power tool 1 is basically used by itself, setting of some parameters related to the operation of the electric power tool 1 and validity/invalidity setting of some functions also related thereto can be performed by wireless communication from the mobile communication terminal 30. FIG. 2 schematically illustrates respective electrical configurations of the electric power tool 1 and the mobile communication terminal 30.

The motor drive circuit 11 of the electric power tool 1 includes, as shown in FIG. 2, a MCU (micro control unit) 21, a drive circuit 22, an induced voltage measuring circuit 23, a current measuring circuit 24, a voltage measuring circuit 25, a regulator 26, a communication unit 27, and the trigger switch 12.

The electric power tool 1 as shown in FIG. 2 illustrates a state in which the battery 3 is attached to the tool body 2 to electrically connect the two with each other. In such a state, the positive electrode of the battery 3 is connected to one end of the motor 9, and an other end of the motor 9 is connected via the drive circuit 22 and the current measuring circuit 24 to the negative electrode of the battery 3. A diode (a so-called flywheel diode), for regenerating electric power induced in a reverse direction when the motor 9 is turned off, is connected in parallel to the motor 9.

The MCU 21 includes a CPU 21a, a memory 21b, an A/D converter 21c, and others, in which the CPU 21a performs various programs stored in the memory 21b, etc. to thereby realize various controls including the drive control of the motor 9. More specifically, the memory 21b includes a ROM, a RAM, an electrically rewritable nonvolatile memory such as a flash memory, or others. Various programs including the below-described main process (FIG. 5), control data, and others are stored in the memory 21b.

The drive circuit 22 is provided on a first current conduction path from the other end of the motor 9 to the negative electrode of the battery 3. The first current conduction path is hereinafter also referred to as a "power line on the negative electrode side". More specifically, the drive circuit 22 includes a semiconductor switch (e.g., a MOSFET) provided on the power line on the negative electrode side to energize/interrupt the power line on the negative electrode side; and a drive unit that turns the semiconductor switch on and off according to a control signal from the MCU 21.

The control signal from the MCU 21 is a pulse signal with a predetermined duty ratio. In the main process as described below, the MCU 21 calculates a target number of rotations of the motor 9 to output a command value indicating a duty ratio corresponding to the target number of rotations (a pulse signal changing with the duty ratio) as the control signal. Based on the duty ratio of the control signal inputted from the MCU 21, the drive circuit 22 turns the semiconductor switch on and off at that duty ratio. Thus, a current corresponding to the duty ratio of the control signal flows in the motor 9, enabling the motor 9 to rotate at the number of rotations corresponding to the duty ratio.

The induced voltage measuring circuit 23 detects an induced voltage generated at the other end of the motor 9 to output the detected voltage to the MCU 21. Since the induced voltage corresponds to the number of rotations of the motor 9, the number of rotations of the motor 9 can be detected based on the induced voltage. The MCU 21 detects an actual number of rotations of the motor 9 based on a detection signal of the induced voltage inputted from the induced voltage measuring circuit 23.

The current measuring circuit 24 is provided on the power line on the negative electrode side to detect a current flowing in the power line on the negative electrode side (i.e., a current flowing in the motor 9) to output the detected current to the MCU 21. The current corresponds to the load on the motor 9, and the current value is larger as the load on the motor 9 is larger. The MCU 21 detects a current flowing in the motor 9 based on a current detection signal inputted from the current measuring circuit 24. The MCU 21 further detects presence/absence of the load on the motor 9 (whether the motor 9 is in the unloaded state or in the loaded state) based on the current value as described below.

The voltage measuring circuit 25 is connected to a second current conduction path from the positive electrode of the battery 3 to the one end of the motor 9. The second current conduction path is hereinafter also referred to as a "power line on the positive electrode side". The voltage measuring circuit 25 detects a voltage in the power line on the positive electrode side, i.e., a voltage of the battery 3 (a battery voltage) to output the detected voltage to the MCU 21. The MCU 21 detects the battery voltage based on a battery voltage detection signal supplied from the voltage measuring circuit 25.

The regulator 26 is connected to the power line on the positive electrode side to thereby generate an operation power voltage (a DC constant voltage) for each component within the motor drive circuit 11 by electric power supplied from the battery 3. Each component within the motor drive circuit 11, including the MCU 21, is operated by the operation power voltage from the regulator 26 as a power source.

The communication unit 27 includes a wireless communication module for wireless communication with the mobile communication terminal 30. A radio wave transmitted from the mobile communication terminal 30 is received by the communication unit 27 in the electric power tool 1 and converted to digital received data to be inputted to the MCU 21. Data transmission from the electric power tool 1 to the mobile communication terminal 30 is also performed via the communication unit 27.

The trigger switch 12 detects an operational state of the trigger 7 to transmit the detected operational state to the MCU 21. The trigger switch 12 includes an operation detection unit that detects whether the trigger 7 is pull-operated and an operation amount detection unit that detects the operation amount if the trigger 7 is pull-operated. The MCU 21 can detect, from various detection signals from the trigger switch 12, whether the trigger 7 is pull-operated and how much the operation amount (the pull amount) is if the trigger 7 is pull-operated.

The mobile communication terminal 30 communicable wirelessly with the electric power tool 1 includes a MCU 31, an operation unit 32, a display unit 33, a memory card interface 34, and a communication unit 35. The MCU 31 includes a ROM, a memory, an I/O, and the like that are not shown.

The operation unit 32 receives an operation input by the user. The operation unit 32 includes a hard key that is press-operated by the user, a touch panel that receives an input by touch operation, or the like.

The display unit 33 has a display device (e.g., a liquid crystal display) for displaying various information and images. The above-described touch panel is arranged to be superposed on a display area of the display unit 33 that displays the various information, etc.

A not-shown memory card can be inserted into or removed from the memory card interface 34 to perform writing or reading of data in the memory card according to a command from the MCU 31 when the memory card is inserted. The communication unit 35 has a wireless communication module that can wirelessly communicate with the electric power tool 1.

As described above, setting of some parameters related to the operation of the electric power tool 1 and validity/invalidity setting of some functions also related thereto can be performed by wireless communication from the mobile communication terminal 30. The mobile communication terminal 30 is installed with application software to enable the setting of the electric power tool 1 by wireless communication.

(3) Soft No-Load Control

The electric power tool 1 according to the present embodiment includes a soft no-load control function as a control function of the motor 9. Soft no-load control (hereinafter referred to also simply as "no-load control") is a control method in which whether the motor 9 is in the unloaded state or in the loaded state is determined, to thereby rotate the motor 9 under no load at a small number of rotations and to rotate the motor 9 under load at a large number of rotations. As described below, a target number of rotations is set to be the "number of rotations during no-load operation" when the motor is under no load and set to be the "number of rotations during no load release" when the motor is under load. The number of rotations during no load release is larger in value than the number of rotations during no load operation.

"Under no load (an unloaded state)" means a state in which no load is applied to the motor 9, i.e., the blade 6 is idling without touching a workpiece, and "under load (a loaded state)" means a state in which a load is applied to the motor 9, i.e., the blade 6 is in contact with another object, such as a workpiece.

In the present embodiment, whether to make the no-load control valid can be selected as appropriate. Specifically, it can be selected by performing a selection input as to whether to make the no-load control valid using the application software in the mobile communication terminal 3 and transmitting the information to the electric power tool 1. If a selection input to make the no-load control valid is performed, a soft no-load control valid request is transmitted from the mobile communication terminal 30 to the electric power tool 1. On the contrary, if a selection input to make the no-load control invalid is performed, a soft no-load control invalid request is transmitted from the mobile communication terminal 30 to the electric power tool 1.

The MCU 21 outputs a command value of the duty ratio corresponding to the set target number of rotations to the drive circuit 22 so as to rotate the motor 9 at the set target number of rotations. However, if the no-load control is set to be valid, the MCU 21, in the unloaded state, performs a feedback control to match the actual number of rotations with the target number of rotations, instead of simply outputting a fixed duty ratio command value corresponding to the target number of rotations. Accordingly, when the motor is under no load in a case where the no-load control is valid, although the target number of rotations itself is set to be a fixed number of rotations during no-load operation, the duty ratio command value outputted from the MCU 21 to the drive circuit 22 varies depending on a difference between the actual number of rotations and the target number of rotations.

However, it is not essential to perform a feedback control in this manner when the motor is under no load, and an open control may also be performed when the motor is under no load. On the contrary, the feedback control may be performed not only when the motor is under no load but also when it is under load.

The number of rotations during no-load operation and the number of rotations during no-load release used when the no-load control is valid can be set by wireless communication from the mobile communication terminal 30 using the application software. In other words, the user, etc. can set, as appropriate, the respective levels of number of rotations at which the motor should be rotated when the motor is under no load and when it is under load. However, the number of rotations during no-load operation and the number of rotations during no-load release can be set within a range in which the latter is larger in value than the former.

If the setting input is not performed via the mobile communication terminal 30 or if the setting input is performed but the setting is later cancelled by a setting input performed via the mobile communication terminal 30, the above numbers of rotations are set to be respective predetermined default values. For example, the number of rotations corresponding to duty ratio 50% is the default value for the number of rotations during no-load operation, and the number of rotations corresponding to duty ratio 100% is the default value for the number of rotations during no-load release.

If the no-load control is set to be valid, the target number of rotations is set to be one of the above-described two numbers of rotations depending on whether the motor is in the unloaded state or in the loaded state regardless of the pull operation amount of the trigger 7. On the contrary, if the no-load control is set to be invalid, the target number of rotations (duty ratio) is set according to the pull operation amount of the trigger 7 regardless of whether the motor is in the unloaded state or in the loaded state (and with no determination thereof).

If the no-load control is set to be valid, the target number of rotations is switched from the number of rotations during no-load operation to the number of rotations during no-load release as the unloaded state is changed to the loaded state. This switch is performed by increasing the duty ratio command value in steps by a fixed amount from the duty ratio corresponding to the number of rotations during no-load operation to the duty ratio corresponding to the number of rotations during no-load release. In other words, the duty ratio is gradually increased for a certain time period to reach the duty ratio corresponding to the number of rotations during no-load release. The amount and the timing of the gradual increase can be decided as appropriate. In the present embodiment, the duty ratio is increased by a fixed amount (e.g., by several percents) in each control period as described below. Instead of setting the duty ratio at startup to be the duty ratio corresponding to the target number of rotations soon after the startup, the duty ratio should gradually be increased from 0% to the duty ratio of the target number of rotations.

In a case where the no-load control is set to be valid, when the motor 9 is in the unloaded state after the startup of the motor 9, the feedback control is performed, in which the number of rotations during no-load operation is the target number of rotations. When the loaded state is detected later, the feedback control is switched to the open control, in which the number of rotations during no-load release is the target number of rotations. In the description below, the drive of the motor at the number of rotations during no-load operation is also referred to as a "low speed drive under no load", and the drive of the motor at the number of rotations during no-load release is also referred to as a "high speed drive under load".

In the present embodiment, in a case where the motor 9 which has been switched to the loaded state is changed to the unloaded state again, it can be selected as appropriate whether to return the target number of rotations to the number of rotations during no-load operation corresponding to the unloaded state (i.e., whether to return to the low speed drive under no load) or to maintain the number of rotations during no-load release corresponding to the loaded state as it is (i.e., or to maintain the high speed drive under load as it is).

Specifically, the selection can be made by performing, using the application software in the mobile communication terminal 30, a selection input as to whether to make valid the detection of the unloaded state after the detection of the loaded state (the return to the low speed drive under no load) and then transmitting the information to the electric power tool 1. If a selection input indicating that the return to the low speed drive under no load should be made valid is performed, a soft no-load return valid request is transmitted from the mobile communication terminal 30 to the electric power tool 1. On the contrary, if a selection input indicating that the return to the low speed drive under no load should be made invalid is performed, a soft no-load return invalid request is transmitted from the mobile communication terminal 30 to the electric power tool 1.

Figure 3:
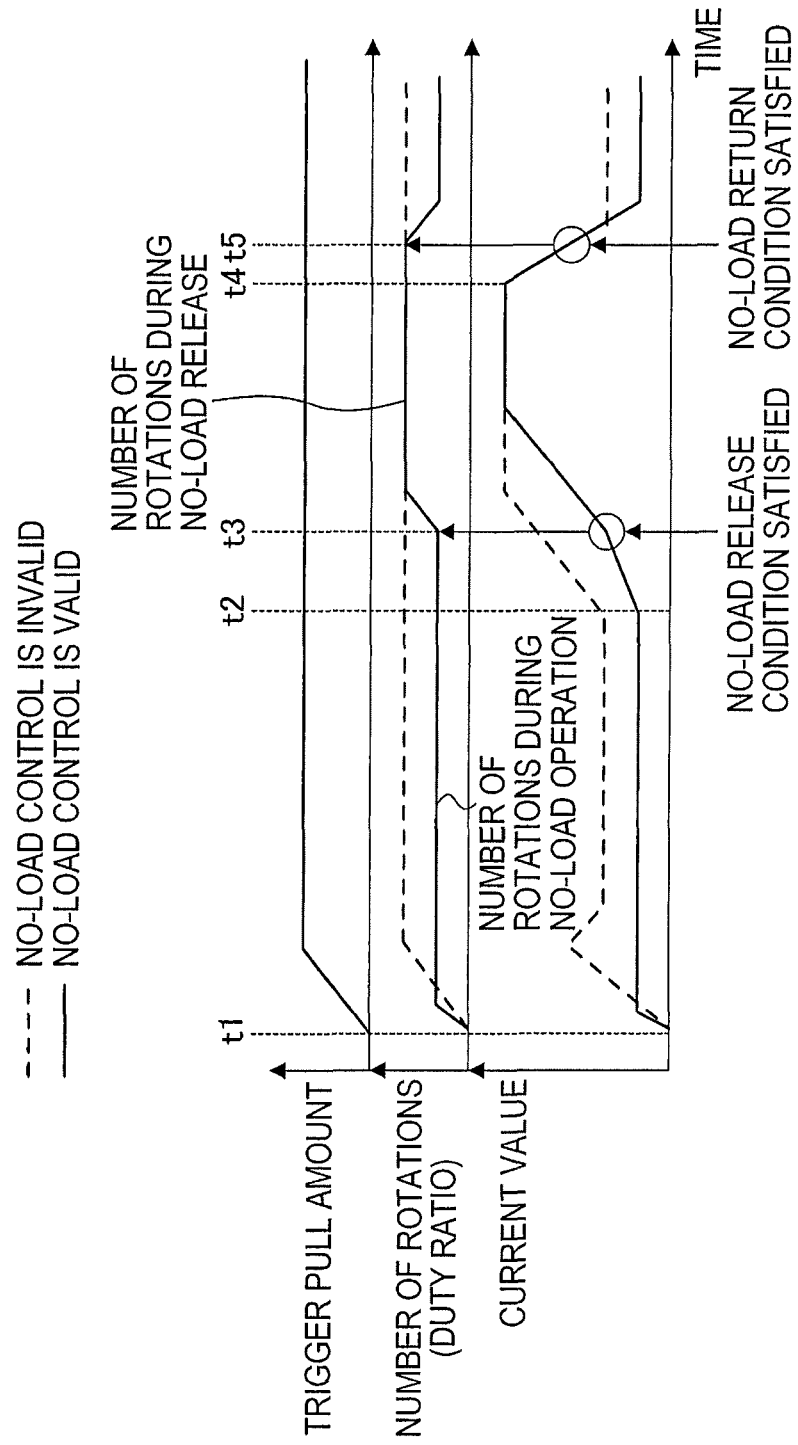
FIG. 3 is an explanatory diagram schematically showing an example of an operation of the electric power tool 1.

FIG. 3 illustrates an example of a change in the setting value of the target number of rotations (duty ratio) and a change in the current value of the motor 9 in a case where the motor 9 is started in the unloaded state, then changed to the loaded state, and changed again to the unloaded state. When the trigger switch 12 is turned on by starting pulling the trigger 7 at time t1, the target number of rotations is set to be the number of rotations during no-load operation to thereby start the low speed drive under no load if the no-load control is valid. If the no-load control is invalid, the target number of rotations changes according to the pull operation amount of the trigger 7 as shown with a dashed line in FIG. 3.

Later at time t2, the blade 6 is brought into contact with the workpiece to thereby change the motor 9 to the loaded state. When a no-load release condition (whose details are described below) is satisfied at time t3, the target number of rotations is switched to the number of rotations during no-load release to thereby start the high speed drive under load.

Later at time t4, the blade 6 moves away from the workpiece to thereby change the motor 9 to the unloaded state. When a no-load return condition (whose details are described below) is satisfied at time t5, the target number of rotations is switched again to the number of rotations during no-load operation to thereby switch the motor 9 to the low speed drive under no load. However, it is in a case where the selection input indicating that the return to the low speed drive under no load should be made valid has been performed, i.e., in a case where the soft no-load return valid request has been made from the mobile communication terminal 30 that the motor 9 is switched to the low speed drive under no load due to the satisfaction of the no-load return condition. In a case where the soft no-load return valid request has not been made, the high speed drive under load is continued even if the motor 9 is changed from the loaded state to the unloaded state.

Next, the no-load release condition will be described. In general, a current flowing in a rotating motor periodically fluctuates. In particular, in a case of the motor 9 driving the blade 6 reciprocatingly as in the present embodiment, the current flowing in the motor 9 differs between when the blade 6 moves forward and when it moves backward. Specifically, the load is relatively small when the blade 6 moves from the top dead position to the bottom dead position, and is relatively large when the blade 6 moves from the bottom dead position to the top dead position. The difference in the load between the moving directions of the blade 6 appears as a difference in the current flowing in the motor 9. Thus, the current in the motor 9 fluctuates as the blade 6 moves up and down.

Further, the fluctuation range of the current (hereinafter referred as a "current amplitude") differs depending on whether the motor 9 is in the unloaded state or in the loaded state. In the blade 6 according to the present embodiment, tips of the jigsaw blade teeth face upward. Accordingly, when the blade 6 is brought into contact with the workpiece, the load at the time of moving from the bottom dead position to the top dead position becomes larger, resulting in a large difference in the load amount between when the blade 6 moves forward and when it moves backward. That is, the current amplitude is larger in the loaded state than in the unloaded state.

Therefore, in the electric power tool 1 according to the present embodiment, the loaded state and the unloaded state are detected based on the current amplitude of the current flowing in the motor 9. The current amplitude can be either a difference between the two extreme values in a decreasing section from the maximum value to the minimum value or a difference between the two extreme values in an increasing section from the minimum value to the maximum value in a current increasing and decreasing process. However, in the present embodiment, the difference between the two extreme values in a decreasing section from the maximum value to the minimum value is used as the current amplitude for detecting the loaded state and the unloaded state.

Specifically, in the present embodiment, the motor is determined to have been brought into the loaded state if either of the following two conditions (A1, A2) is satisfied.

Condition A1: Detecting that the current amplitude is equal to or larger than the current range threshold a predetermined number of times (a number-of-detections threshold) or more Condition A2: Having a state with no fluctuation in the current (with a current amplitude of 0 or approximately 0) maintained for a predetermined time period Regarding the condition A1, in the present embodiment, the current amplitude in a section where the current decreases from the maximum value to the minimum value is a detection target as described above. However, it is not essential to thus make only the current amplitude in a decreasing section to be a detection target. The current amplitude in an increasing section may also be a detection target or only the current amplitude in an increasing section may be a detection target. Each time it is detected that the current amplitude is equal to or larger than the current range threshold, the number of detections (the number of load detections) is cumulatively added. However, if a state in which the current amplitude is not equal to or larger than the current range threshold has continued for a predetermined time period, the number of load detections is cleared to be 0.

The current range threshold and the number-of-detections threshold can be set as appropriate by wireless communication from the mobile communication terminal 30. If there is no setting input from the mobile communication terminal 30, or if a setting input from the mobile communication terminal 30 to cancel the setting input of the thresholds is performed, the current range threshold and the number-of-detections threshold are each set to be respective predetermined default values.

Both in a case where the current range threshold and the number-of-detections threshold are set as appropriate from the mobile communication terminal 30 and in a case where the default values are used therefor, the status of the battery 3 is referenced.

Specifically, in the present embodiment, the above thresholds are each corrected according to the voltage of the battery 3. For example, although the set value is used as it is for the current range threshold if the voltage of the battery 3 is within a specified range, it is corrected to be a smaller value than the set value if the voltage of the battery 3 is below the specified range. The same holds true for the number-of-detections threshold. It can be decided as appropriate how to make a specific correction of each of the above thresholds according to the voltage of the battery 3. The above thresholds may be corrected using information (information indicating the status of the battery 3) other than the voltage of the battery 3 such as the temperature of the battery 3, for example.

The current amplitude is also used for detecting a switch from the loaded state to the unloaded state. Further, for detecting a switch from the loaded state to the unloaded state, a current value at a predetermined timing in a duty ratio increasing process when the unloaded state is switched to the loaded state is also used. That is, when the loaded state is detected during the unloaded state, the duty ratio command value from the MCU 21 gradually (in steps) increases from the duty ratio corresponding to the number of rotations during no-load operation to the duty ratio corresponding to the number of rotations during no-load release, and the current of the motor 9 is detected at a predetermined timing in the increasing process to retain the detected value as a return threshold. The retained return threshold is then used for detecting a switch from the loaded state to the unloaded state.

It can be decided as appropriate at which timing in the increasing process the current value is to be retained as a return threshold. For example, in a case where the duty ratio is increased from 50% to 100%, the current value may be detected and retained when the duty ratio has reached approximately 75%, which is halfway therebetween.

In the present embodiment, it is determined that the loaded state has been switched to the unloaded state if both of the following two conditions (B1, B2) are satisfied.

Condition B1: Having a current flowing in the motor 9 equal to or smaller than the return threshold Condition B2: Detecting that the current amplitude is below the current range threshold a predetermined number of times (a number-of-detections threshold) or more Regarding the condition B2, in the present embodiment, the current amplitude in a section where the current decreases from the maximum value to the minimum value is a detection target as described regarding the condition A1. Of course, regarding the condition B2 also, it is not essential to make only the current amplitude in a decreasing section to be a detection target. The current amplitude in an increasing section may also be a detection target, or only the current amplitude in an increasing section may be a detection target.

When it is detected that the loaded state is changed to the unloaded state, the drive of the motor 9 returns to the low speed drive under no load, in which the target number of rotations is the number of rotations during no-load operation. However, it is in a case where the soft no-load return valid request has been made from the mobile communication terminal 30 that the drive of the motor 9 returns to the low speed drive under no load when the loaded state is changed to the unloaded state. In a case where the soft no-load return valid request has not been made, the high speed drive under load is continued even if the motor is brought into the unloaded state after the loaded state has been detected to switch the drive of the motor 9 to the high speed drive under load.

Figure 4:
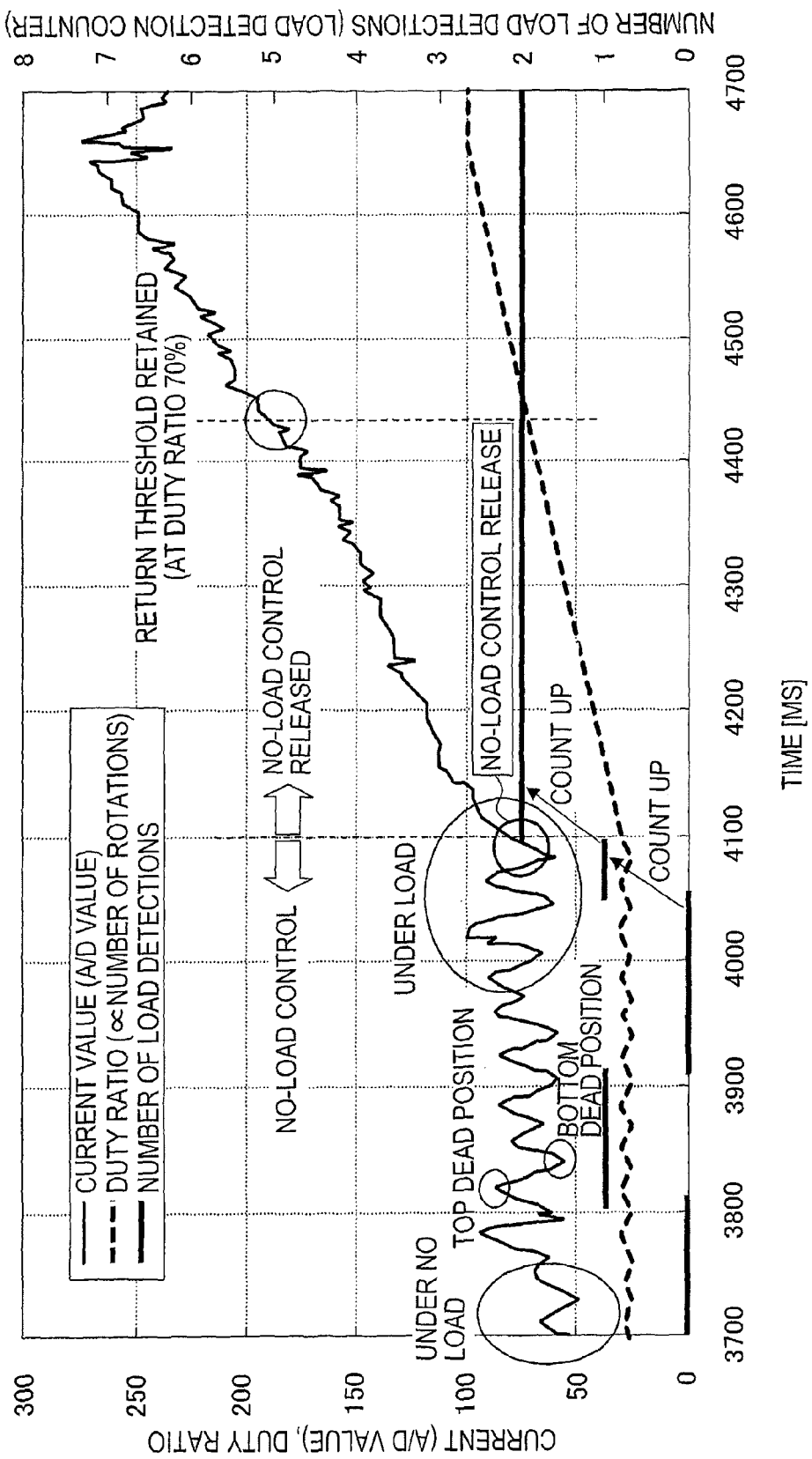
FIG. 4 is an explanatory diagram showing an example of changes in the current value, the duty ratio, and the number of load detections in a process switching from an unloaded state to a loaded state.

FIG. 4 illustrates a specific example of operation in a change from the unloaded state to the loaded state after startup. FIG. 4 illustrates a change in the current value (the A/D converted value) of the motor 9, the duty ratio of the duty ratio command value outputted from the MCU 21 to the drive circuit 22, and the number of detections that the current amplitude is equal to or larger than the current range threshold (the number of load detections) in a case where the loaded state that has continued for a while after startup is switched to the loaded state. In FIG. 4, the unloaded state is switched to the loaded state at around 4000 ms.

During the unloaded state after the startup, the current amplitude is relatively small and is not usually equal to or larger than the current range threshold. However, there is a possibility that the current amplitude is temporarily equal to or larger than the current range threshold due to reasons such as noise or others. FIG. 4 illustrates that the current greatly fluctuates due to some reasons just before 3800 ms. Since the current range has become equal to or larger than the current range threshold at this change, the number of load detections is increased from 0 to 1. However, the state in which the current amplitude is below the current range threshold continues from that point, to thereby clear the number of load detections to 0 after around 3900 ms.

When the loaded state starts at around 4000 ms, the current amplitude becomes larger, thereby increasing the number of load detections. In the example of FIG. 4, the number-of-detections threshold is set to be 2. Therefore, when the number of load detections is increased to 2 at around 4100 ms, the loaded state is detected to release the no-load control. In other words, the low speed drive under no load is switched to the high speed drive under load.

After the no-load control is released, the duty ratio of the motor 9 gradually increases from the duty ratio (25% in the example of FIG. 4) of the low speed drive under no load to the duty ratio (100% in the example of FIG. 4) corresponding to the high speed drive under load, as already described. At a predetermined timing (duty ratio 70% in the example of FIG. 4) in the increasing process, the current value at that time is obtained to retain the obtained current value as a return threshold. The retained return threshold is used to detect the unloaded state when the loaded state is again changed to the unloaded state (specifically, to detect the condition B1), as already described.

(4) Description of Main Process

The main process executed by the MCU 21 of the electric power tool 1 will be described with reference to FIGS. 5 to 11. In the MCU 21 of the electric power tool 1, the CPU 21a, in starting its operation, reads from the memory 21b a program for the main process shown in FIG. 5 to execute the program. The CPU 21a repeatedly executes processes of S120 to S160 with a predetermined control period in the main process shown in FIG. 5.

Figure 5:
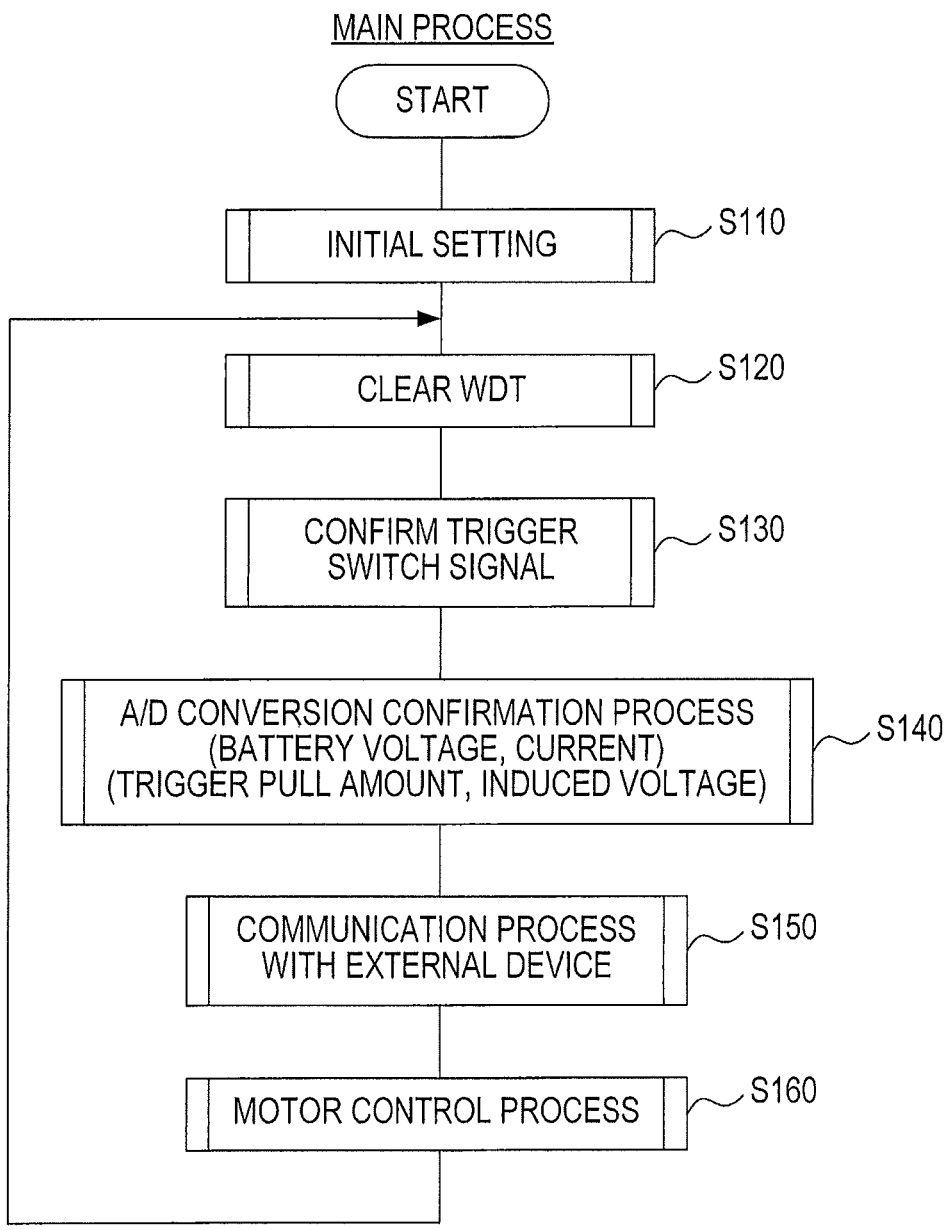
FIG. 5 is a flowchart showing a main process.

In starting the main process shown in FIG. 5, the CPU 21a performs various initial settings in S110 and clears a WDT (a watchdog timer) in S120. Various flags and counters described below are all cleared in the initial setting of S110. In S130, a signal from the trigger switch 12 is confirmed. In other words, an operational state of the trigger 7 is confirmed. In S140, an A/D conversion confirmation process is executed. Specifically, A/D conversion of a detection signal from the voltage measuring circuit 25, a detection signal from the current measuring circuit 24, a detection signal from the trigger switch 12, and a detection signal from the induced voltage measuring circuit 23 is performed by the A/D converter 21c to obtain respective converted data, i.e., data of the battery voltage, the current of the motor 9, the pull amount of the trigger 7, and the induced voltage of the motor 9.

In S150, a communication process with an external device is executed. Specifically, by performing data communication with the mobile communication terminal 30, for example, information that is set using the application software in the mobile communication terminal 30 is obtained. The information that can be obtained from the mobile communication terminal 30 includes the soft no-load control valid/invalid request, the soft no-load return valid/invalid request, the number of rotations during no-load operation, the number of rotations during no-load release, the current range threshold, and the number-of-detections threshold.

Figure 6:
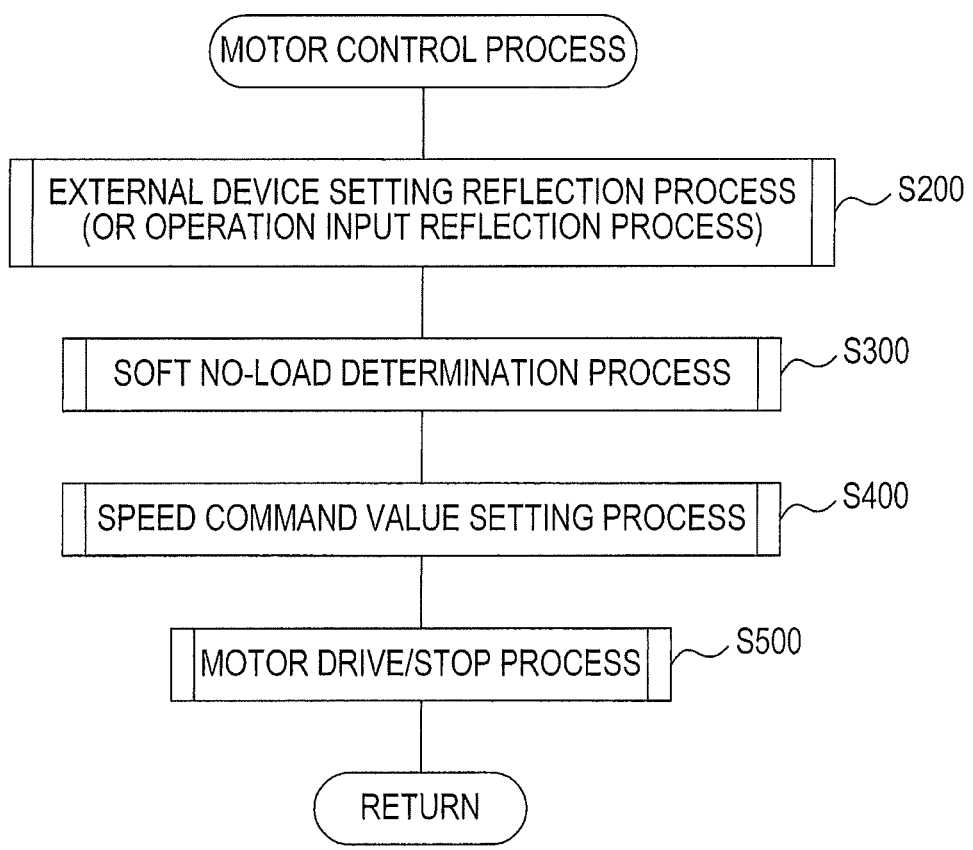
FIG. 6 is a flowchart showing details of a motor control process of S160 in the main process shown in FIG. 5.

In S160, a motor drive process is executed based on the various information confirmed and obtained in the processes of S130 to S150. The specific contents of the motor drive process of S160 are as shown in FIG. 6.

In proceeding to the motor drive process, the CPU 21a executes, in S200, an external device setting reflection process. In 200, in place of the external device setting reflection process (or in addition to the external device setting reflection process) as shown in parentheses in FIG. 6, an operation input reflection process may be executed, which will be described later as a second embodiment.

Figure 7:
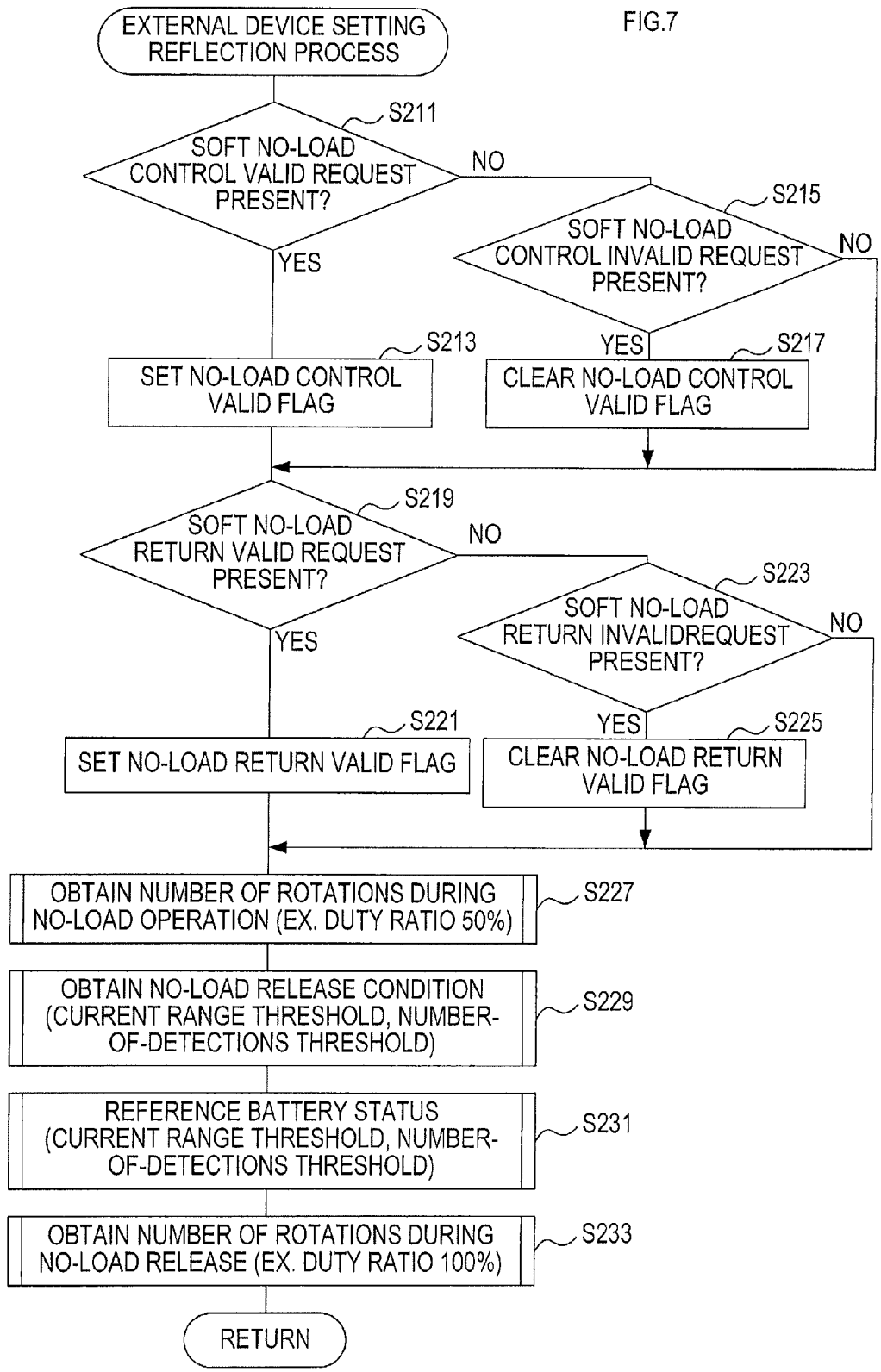
FIG. 7 is a flowchart showing details of an external device setting reflection process of S200 in the motor control process shown in FIG. 6.

The details of the external device setting reflection process of S200 are as shown in FIG. 7. In proceeding to the external device setting reflection process shown in FIG. 7, the CPU 21a determines in S211 whether the soft no-load control valid request from the mobile communication terminal 30 is present. If the soft no-load control valid request is present, a no-load control valid flag is set in S213 and the process proceeds to S219.

If, in S211, the soft no-load control valid request is not present, it is determined in S215 whether the soft no-load control invalid request is present. If the soft no-load control invalid request is present, the no-load control valid flag is cleared in S217 and the process proceeds to S219. If the soft no-load control invalid request is not present, the process proceeds directly to S219.

It is determined in S219 whether the soft no-load return valid request from the mobile communication terminal 30 is present. If the soft no-load return valid request is present, a no-load return valid flag is set in S221 and the process proceeds to S227.

If, in S219, the soft no-load return valid request is not present, it is determined in S223 whether the soft no-load return invalid request is present. If the soft no-load return invalid request is present, the no-load return valid flag is cleared in S225 and the process proceeds to S227. If the soft no-load return invalid request is not present, the process directly proceeds to S227.

In S227, the number of rotations during no-load operation inputted via the mobile communication terminal 30 is obtained. If the setting input is not performed via the mobile communication terminal 30, or if the setting is cancelled, a default value is set in S227 as the number of rotations during no-load operation. The description of the present example will continue on the premise that the number of rotations corresponding to duty ratio 50%, for example, is inputted and transmitted via the mobile communication terminal 30 as the number of rotations during no-load operation.

In S229, the no-load release condition inputted via the mobile communication terminal 30, i.e., the current range threshold and the number-of-detections threshold, is obtained. If the setting input is not performed via the mobile communication terminal 30, or if the setting is cancelled, respective default values are set in S229 as the current range threshold and the number-of-detections threshold.

In S231, the status of the battery is referenced for the current range threshold and the number-of-detections threshold obtained or set in S229. That is, the above thresholds are each corrected according to the voltage of the battery 3 as already described.

In S233, the number of rotations during no-load release inputted via the mobile communication terminal 30 is obtained. If the setting input is not performed via the mobile communication terminal 30, or if the setting is cancelled, a default value is set in S233 as the number of rotations during no-load release. The description of the present example will continue on the premise that the number of rotations corresponding to duty ratio 100%, for example, is inputted and transmitted via the mobile communication terminal 30 as the number of rotations during no-load release.

Figure 8:
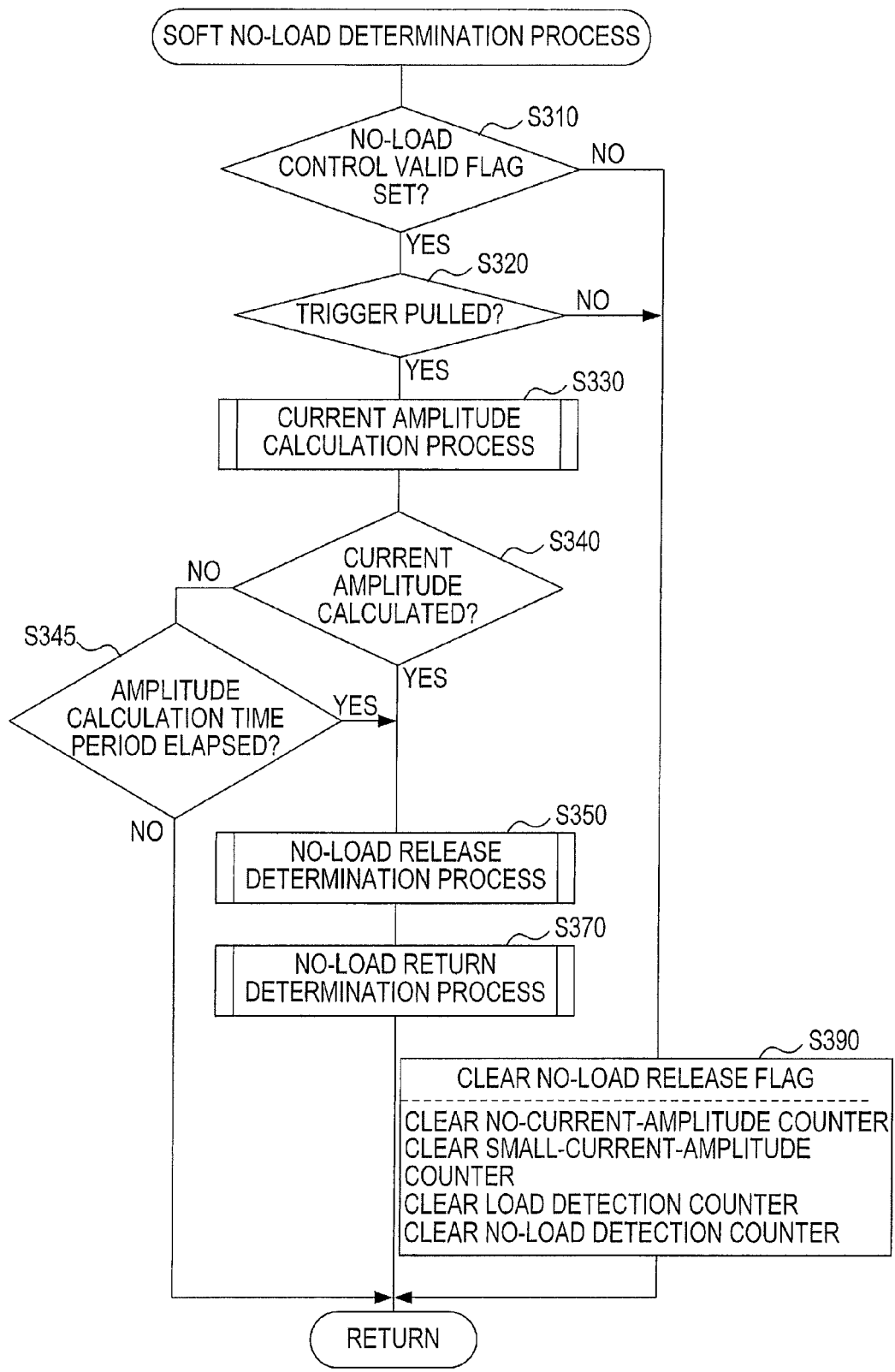
FIG. 8 is a flowchart showing details of a soft no-load determination process of S300 in the motor control process shown in FIG. 6.

Referring back to FIG. 6, a soft no-load determination process is executed in S300 after the external device setting reflection process of S200. The specific contents of the soft no-load determination process of S300 are as shown in FIG. 8. In proceeding to the soft no-load determination process shown in FIG. 8, the CPU 21a determines in S310 whether the no-load control valid flag is set, i.e., whether the no-load control is set to be valid.

If the no-load control valid flag is not set (i.e., if the no-load control is invalid), a no-load release flag is cleared and a no-current-amplitude counter, a small-current-amplitude counter, a load detection counter, and a no-load detection counter are all cleared in S390.

If, in S310, the no-load control valid flag is set, it is determined in S320 whether the trigger 7 is pulled by the user, etc. If the trigger 7 is not pulled, the process of S390 is executed. If the trigger 7 is pulled, a current amplitude calculation process is executed in S330.

As already described, in the present embodiment, the current amplitude in a decreasing section, in which the current decreases from the maximum value to the minimum value, is used for no-load detection and load detection. Therefore, it is determined in S330 whether a change from the maximum value to the minimum value has been detected based on respective current detection values at a plurality of the most recent control timings including the present control period (control timing), and if the change has been detected, the difference between the maximum value and the minimum value is calculated as the current amplitude.

In S340, it is determined whether the current amplitude has been calculated in S330. If the current amplitude has not been calculated in S330, it is determined in S345 whether a predetermined amplitude calculation time period has elapsed. Each time an affirmative determination is made in S345, the amplitude calculation time period is cleared to start time counting. If the amplitude calculation time period has not yet elapsed, the soft no-load determination process is terminated.

If it is determined in S340 that the current amplitude has been calculated, or if it is not determined in S340 that the current amplitude has been calculated and is determined in S345 that the amplitude calculation time period has elapsed (i.e., if a state in which the current amplitude is not calculated has continued for the amplitude calculation time period), the process proceeds to a no-load release determination process of S350.

Figure 9:
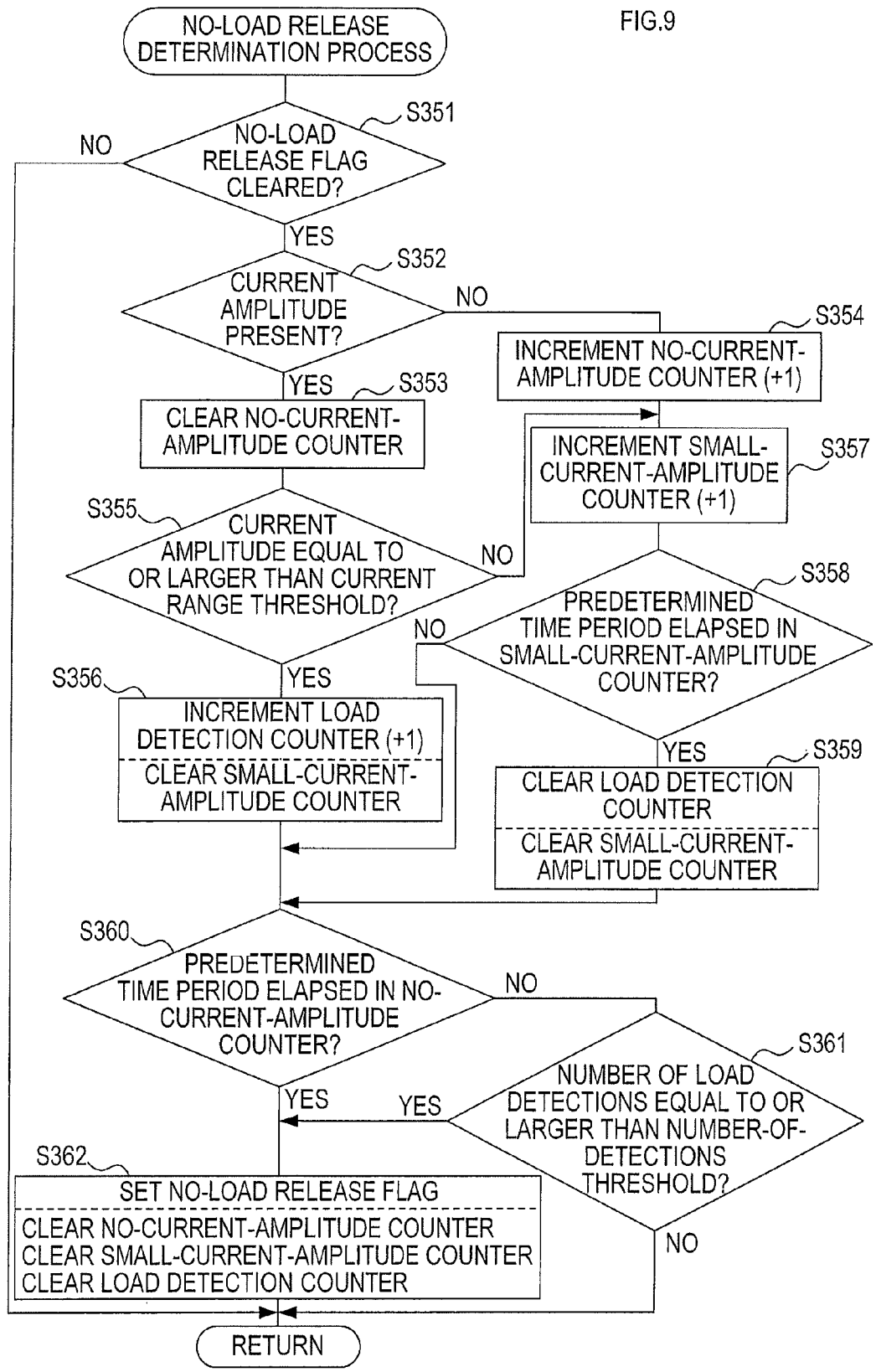
FIG. 9 is a flowchart showing details of a no-load release determination process of S350 in the soft no-load determination process shown in FIG. 8.

The no-load release determination process of S350 is a process to detect the loaded state, whose details are as shown in FIG. 9. In proceeding to the no-load release determination process shown in FIG. 9, the CPU 21a determines in S351 whether the no-load release flag is cleared. If the no-load release flag is set (i.e., if the motor 9 is already in the loaded state), the no-load release determination process is terminated. If the no-load release flag is cleared (i.e., if the determination that motor 9 is in the unloaded state has been continuing), the process proceeds to S352.

It is determined in S352 whether the current amplitude is present, i.e., whether an affirmative determination is made in S340 because the current amplitude has been calculated in S330 in the soft no-load determination process shown in FIG. 8, or an affirmative determination is made in S345 because the amplitude calculation time period has elapsed without calculating the current amplitude.

If it is determined that the current amplitude is present, the no-current-amplitude counter is cleared in S353. In S355, it is determined whether the current amplitude is equal to or larger than the current amplitude threshold. If the current amplitude is equal to or larger than the current amplitude threshold, the load detection counter is incremented by one and the small-current-amplitude counter is cleared in S356, and the process proceeds to S360.

If it is determined in S352 that the current amplitude is not present, the no-current-amplitude counter is incremented by one in S354 and the process proceeds to S357. If it is determined in S355 that the current amplitude is smaller than the current amplitude threshold, the process also proceeds to S357.

In S357, the small-current-amplitude counter is incremented by one. In S358, it is determined whether the small-current-amplitude counter has counted up a predetermined time period, i.e., whether the elapsed time period indicated by the counter value of the small-current-amplitude counter has become equal to or larger than the predetermined time period. If the small-current-amplitude counter has not counted up the predetermined time period, the process proceeds to S360. If the small-current-amplitude counter has counted up the predetermined time period, the process proceeds to S359. In S359, the load detection counter and the small-current-amplitude counter are cleared, and the process proceeds to S360.

In S360, it is determined whether the no-current-amplitude counter has counted up a predetermined time period, i.e., whether the elapsed time period indicated by the counter value of the no-current-amplitude counter has become equal to or larger than the predetermined time period. If the no-current-amplitude counter has not counted up the predetermined time period, the process proceeds to S361, where it is determined whether the number of load detections (the value of the load detection counter) is equal to or larger than the number-of-detections threshold. If the number of load detections is equal to or larger than the number-of-detections threshold, it is determined that the motor 9 has been brought into the loaded state and the process proceeds to S362. If, in S360, the no-current-amplitude counter has counted up the predetermined time period, it is also determined that the motor 9 has been brought into the loaded state and the process proceeds to S362.

In S362, the no-load release flag is set, and the no-current-amplitude counter, the small-current-amplitude counter, and the load detection counter are cleared. Setting the no-load release flag means that the motor 9 has been brought into the loaded state.

Figure 10:
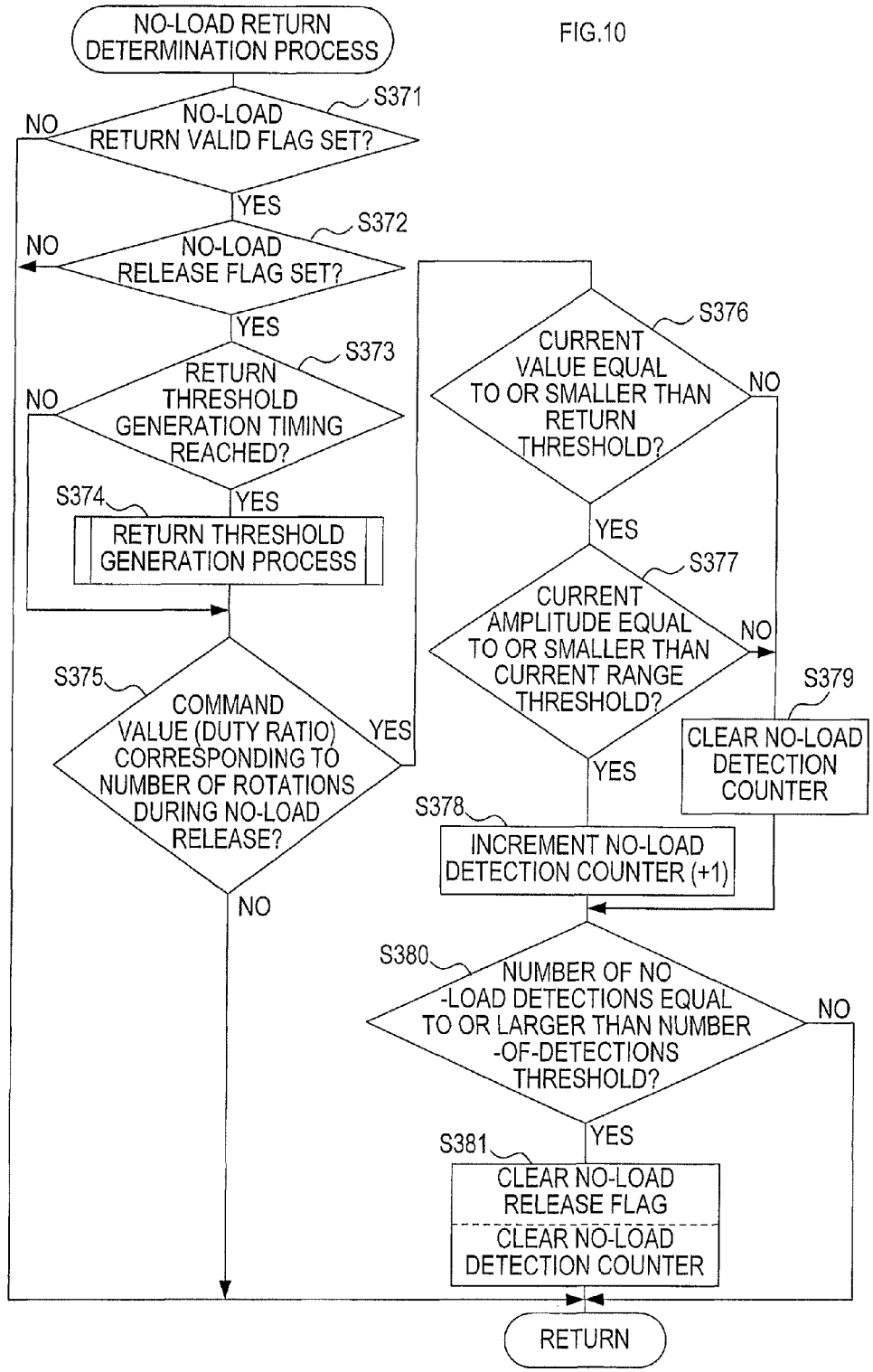
FIG. 10 is a flowchart showing details of a no-load return determination process of S370 in the soft no-load determination process shown in FIG. 8.

Referring back to FIG. 8, a no-load return determination process is executed in S370 after the no-load release determination process of S350. The no-load return determination process of S370 is a process to detect a change from the loaded state to the unloaded state, whose specific contents are as shown in FIG. 10. In proceeding to the no-load return determination process shown in FIG. 10, the CPU 21a determines in S371 whether a no-load return valid flag is set. If the no-load return valid flag is cleared, the no-load release determination process is terminated. If the no-load return valid flag is set, the process proceeds to S372.

In S372, it is determined whether the no-load release flag is set. If the no load release flag is cleared (i.e., if the motor 9 is already in the unloaded state), the no-load return determination process is terminated. If the no load release flag is set (i.e., if the determination that motor 9 is in the loaded state has been continuing), the process proceeds to S373.

In S373, it is determined whether a return threshold generation timing is reached. The return threshold generation timing is a timing at which a predetermined duty ratio at which the return threshold should be obtained is reached in an increasing process from the duty ratio corresponding to the number of rotations during no-load operation in the unloaded state to the duty ratio corresponding to the number of rotations during no-load release in the loaded state. The return threshold generation timing is a timing determined by a predetermined calculation method based on the respective duties corresponding to the number of rotations during no-load operation and the number of rotations during no-load release (the timing of duty ratio 70% in the example of FIG. 4).

If the return threshold generation timing is not reached, the process proceeds to S375. If the return threshold generation timing is reached, a return threshold generation process is executed in S374 and the process proceeds to S375. The return threshold generation process of S374 is a process where the present current value of the motor 9 (the current value obtained in S140 in FIG. 5) is generated (set) as the return threshold.

In S375, it is determined whether the present duty ratio command value outputted to the drive circuit 22 has increased to the value corresponding to the number of rotations during no-load release. For example, if the duty ratio is still in an increasing process because the unloaded state has just switched to the loaded state, a negative determination is made in S375. On the contrary, if the duty ratio command value has reached the duty ratio corresponding to the number of rotations during no-load release because time has elapsed after the switch from the unloaded state to the loaded state, the process proceeds to S376.

In S376, it is determined whether the current value is equal to or smaller than the return threshold. If the current value is larger than the return threshold, the no-load detection counter is cleared in S379 and the process proceeds to S380. If the current value is equal to or smaller than the return threshold, it is determined in S377 whether the current amplitude is below the current range threshold. If the current range is equal to or larger than current range threshold, the no-load detection counter is cleared in S379 and the process proceeds to S380. If the current amplitude is below the current range threshold, the no-load detection counter is incremented by one in S378 and the process proceeds to S380.

In S380, it is determined whether the number of no-load detections (the value of the no-load detection counter) is equal to or larger than the number-of-detections threshold. If the number of no-load detections is equal to or larger than the number-of-detections threshold, it is determined that the motor 9 has been brought into the unloaded state and the process proceeds to S381. In S381, the no-load release flag is cleared and the no-load detection counter is also cleared.

Figure 11:
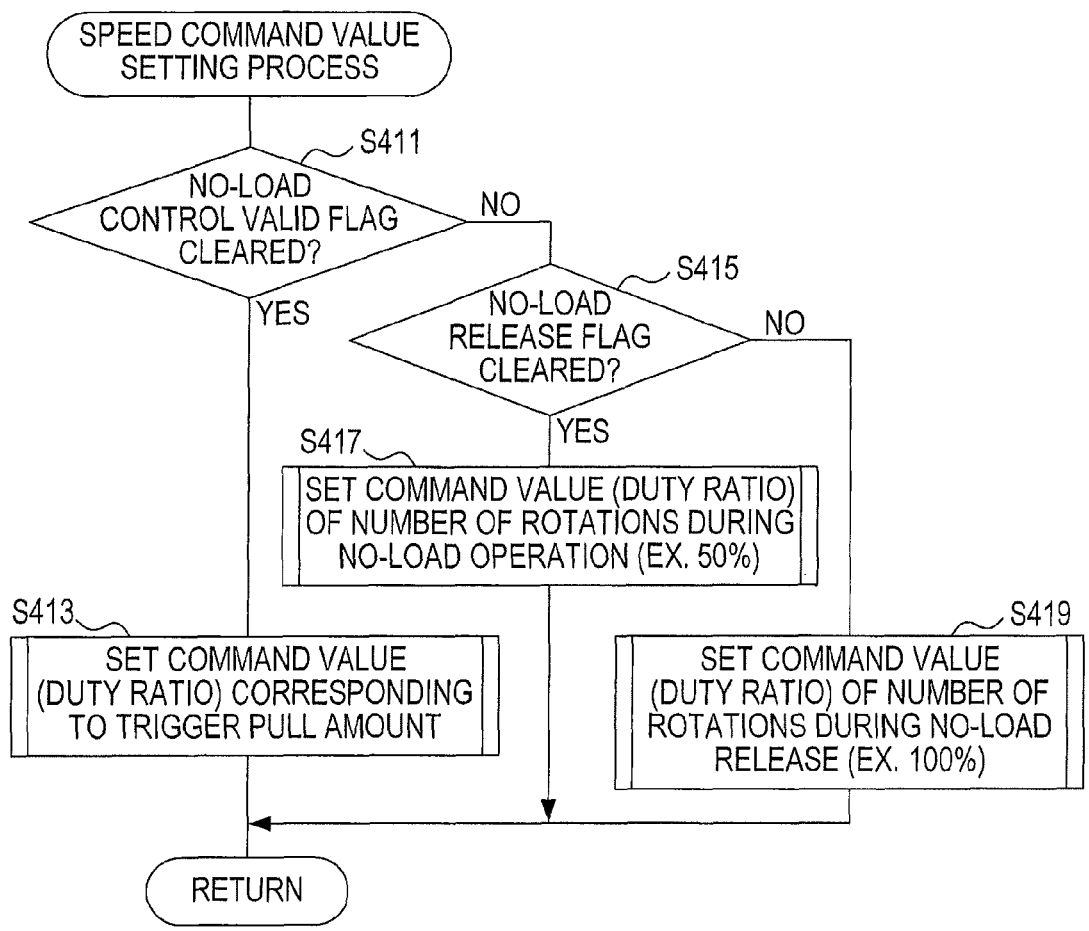
FIG. 11 is a flowchart showing details of a speed command value setting process of S400 in the motor control process shown in FIG. 6.

Referring back to FIG. 6, a speed command value setting process is executed in S400 after the soft no-load determination process of S300. The specific contents of the speed command value setting process of S400 are as shown in FIG. 11. In proceeding to the speed command value setting process shown in FIG. 11, the CPU 21a determines in S411 whether the no-load control valid flag is cleared.

If, in S411, the no-load control valid flag is cleared, i.e., if the no-load control is set to be invalid, the process proceeds to S413, where the duty ratio command value of a duty ratio corresponding to the pull amount of the trigger 7 is set.

If, in S411, the no-load control valid flag is set, i.e., if the no-load control is set to be valid, it is determined in S415 whether the no-load release flag is cleared. If the no-load release flag is cleared, the duty ratio command value of the duty ratio corresponding to the number of rotations during no-load operation, which is the target number of rotations in the unloaded state, is set in S417. More specifically, in S417, the duty ratio command value is calculated by a feedback calculation based on a difference between the number of rotations during no-load operation and the actual number of rotations.

If, in S415, the no-load release flag is set, the duty ratio command value of the duty ratio corresponding to the number of rotations during no-load release, which is the target number of rotations in the loaded state, is set in S419.

Referring back to FIG. 6, a motor drive/stop process is executed in S500 after the speed command value setting process of S400. Specifically, the CPU 21a outputs a control signal of the duty ratio command value set in the speed command value setting process of S400 to the drive circuit 22, to thereby energize the motor 9 at the duty ratio of the set duty ratio command value to rotate the motor 9 at the number of rotations corresponding to the duty ratio.

(5) Effects, etc. of First Embodiment

According to the electric power tool 1 of the present embodiment described above, it is possible to accurately detect the unloaded state and the loaded state of the motor 9, since the unloaded state and the loaded state of the motor 9 are detected based on the current amplitude of the motor 9.

More specifically, if the number of times the current amplitude is determined to be equal to or larger than the current range threshold (the number of load detections) has become equal to or larger than the number-of-detections threshold, or if a state in which the current amplitude is not present has continued for the predetermined time period, the motor 9 is determined to be in the loaded state. Accordingly, erroneous detection of the loaded state is suppressed to thereby detect the loaded state with high accuracy.

If a state in which the current amplitude is smaller than the current range threshold has continued for the predetermined time period, the load detection counter is cleared (initialized). Accordingly, erroneous determination of the loaded state due to an unintended (temporal or momentary) occurrence of current fluctuation in the unloaded state can be suppressed to thereby increase the accuracy of detection of the loaded state.

Some setting items and parameters can be set as appropriate by wireless communication from the mobile communication terminal 30. Thus, the user, etc. can set the above setting items and parameters to be desired values according to the state, the use status, the use environment, or the like of the electric power tool 1.

The sensitivity of detection of the loaded state and the unloaded state can be changed as appropriate. In the present embodiment in particular, an electric power tool 1 with high usability can be provided since the setting as above is possible by remote operation using wireless communication.

Also, the configuration is devised such that, if the motor is brought into the unloaded state after a switch from the low speed drive under no load to the high speed drive under load, whether to return to the low speed drive under no load can be set as appropriate. In other words, the user can select whether to return to the low speed drive under no load each time the loaded state is changed to the unloaded state, or to maintain the high speed drive under load even if the motor 9 is brought into the unloaded state after the motor 9 has been brought into the loaded state. Therefore, usability for the user can further be improved.

In the present embodiment, the blade 6 is an example of the appliance element of the present invention, the transmission mechanism 10 is an example of the drive mechanism of the present invention, the MCU 21 of the electric power tool 1 is an example of the control unit of the present invention, the mobile communication terminal 30 is an example of the external device of the present invention, the voltage measuring circuit 25 is an example of the voltage detection unit of the present invention, the communication unit 27 is an example of the communication input receiving unit (the threshold setting input unit, the number-of-rotations setting input unit, and the selection input receiving unit) of the present invention, the current range threshold is an example of the fluctuation occurrence detection threshold of the present invention, the number-of-detections threshold is an example of the number-of-fluctuation-detections threshold of the present invention, the number of rotations during no-load operation is an example of the number of rotations under no load of the present invention, the number of rotations during no-load release is an example of the number of rotations under load of the present invention, the predetermined time period used in the determination process of S358 in FIG. 9 is an example of the first determination time period of the present invention, and the predetermined time period used in the determination process of S360 in FIG. 9 is an example of the second determination time period of the present invention.

Second Embodiment

Figure 12:
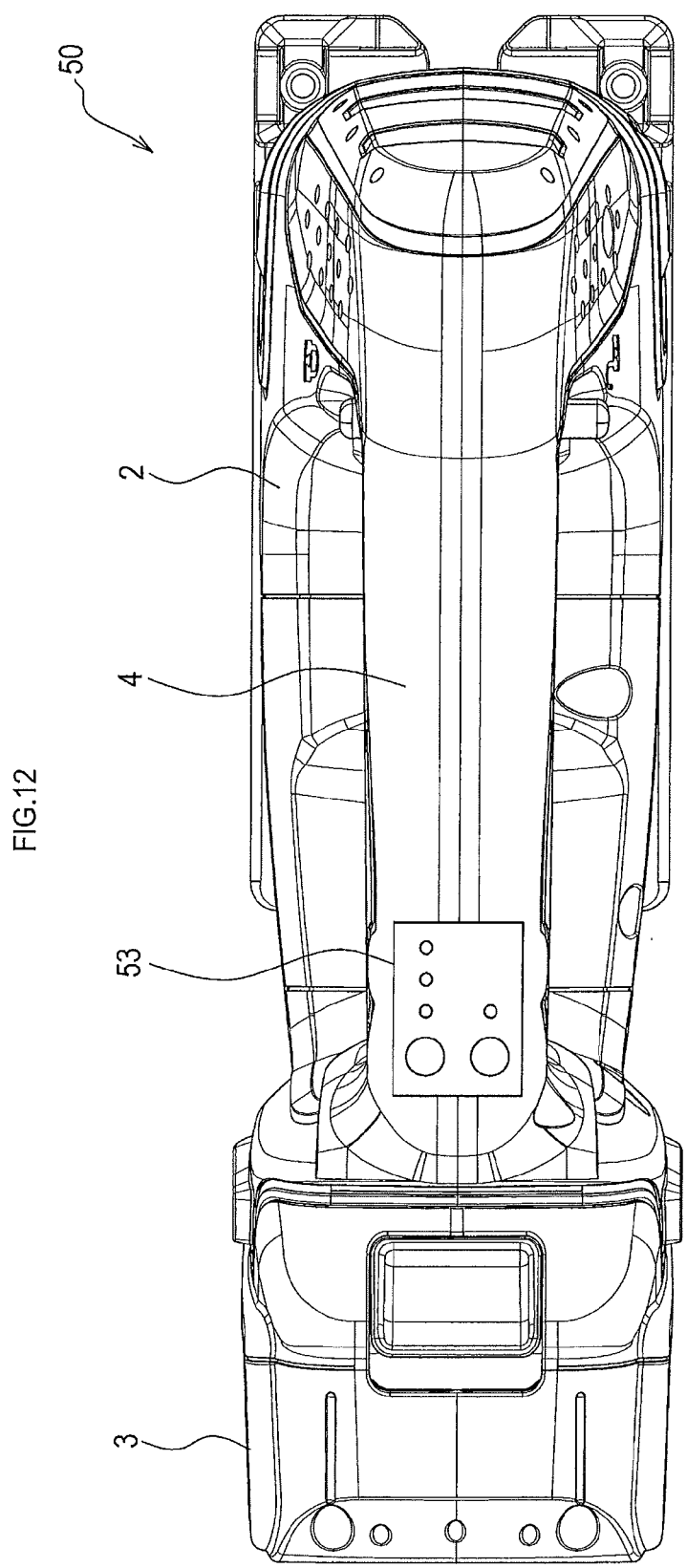
FIG. 12 is a plane view of an electric power tool 50 according to a second embodiment.

Next, an electric power tool 50 according to a second embodiment will be described with reference to FIG. 12. When compared with the electric power tool 1 of the first embodiment shown in FIG. 1, the electric power tool 50 of the present embodiment shown in FIG. 12 mainly differs therefrom in that the electric power tool 50 includes an operation/display panel 53. As shown in FIG. 12, the electric power tool 50 according to the present embodiment has the operation/display panel 53 provided on a top surface on an end side (on the battery 3 side) of the grip portion 4.

Figure 13A:
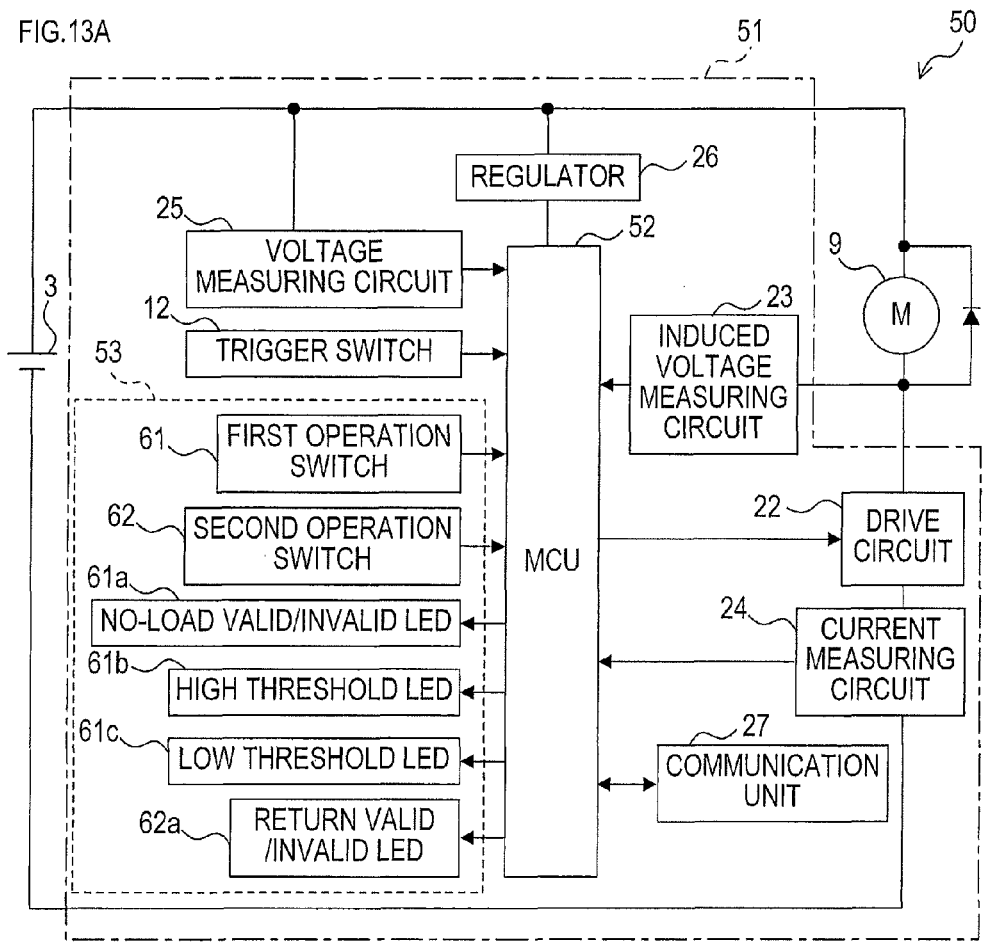
FIGS. 13A and 13B are block diagrams showing an electrical configuration of the electric power tool 50 according to the second embodiment.
Figure 13B:
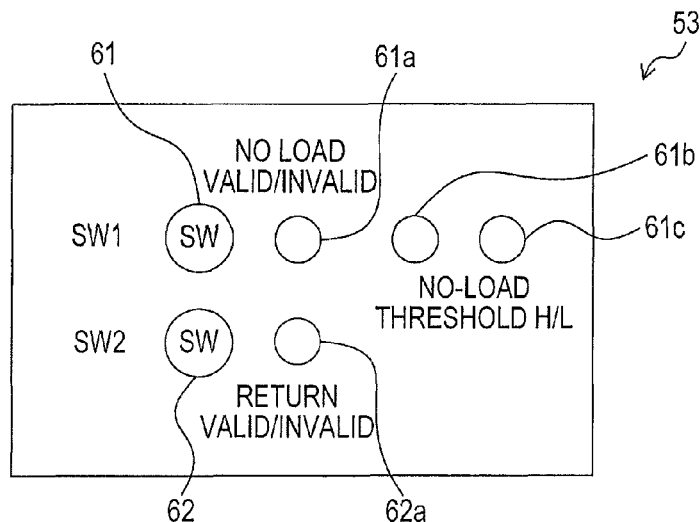

The specific configuration of the operation/display panel 53 is as shown in FIGS. 13A and 13B. As shown in FIGS. 13A and 13B, the operation/display panel 53 includes a first operation switch 61, a second operation switch 62, a no-load valid/invalid LED 61*a*, a high threshold LED 61*b*, a low threshold LED 61*c*, and a return valid/invalid LED 62*a*. The LEDs 61*a*, 61*b*, 61*c*, and 62*a* are all known semiconductor light emitting devices (light emitting diodes). A MCU 52 controls the turning on and off of the LEDs according to the operation input by the respective switches 61, 62.

A user, etc. of the electric power tool 50 can perform the setting of validity/invalidity of no-load control and the setting of validity/invalidity of a return from a high speed drive under load to a low speed drive under no load (a return to the no-load control). Further, a current range threshold and a number-of-detections threshold can each selectively be set as either of a predetermined relatively high value (a high threshold) or a predetermined relatively low value (a low threshold).

That is, the first embodiment is configured such that the above setting items can each be set by wireless communication from the mobile communication terminal 30; in the present embodiment, the above setting items can be set via the operation/display panel 53.

The configuration may be devised such that the setting via the operation/display panel 53 and the setting from the mobile communication terminal 30 are both possible. Also, the items that can be set via the operation/display panel 53 can be decided as appropriate. For example, at least either a number of rotations during no-load operation or a number of rotations during no-load release may be selected and set via the operation/display panel 53.

The method of setting the above setting items using the operation/display panel 53 and the lighting state of each of the LEDs will be described with reference to FIG. 14. In an initial state of the electric power tool 50 after startup, the no-load control is set to be invalid, and the return from the high speed drive under load to the low speed drive under no load during no-load control is also set to be invalid. Therefore, the LEDs on the operation/display panel 53 are all off in the initial state as shown in the left-hand state diagram in FIG. 14.

Figure 14:
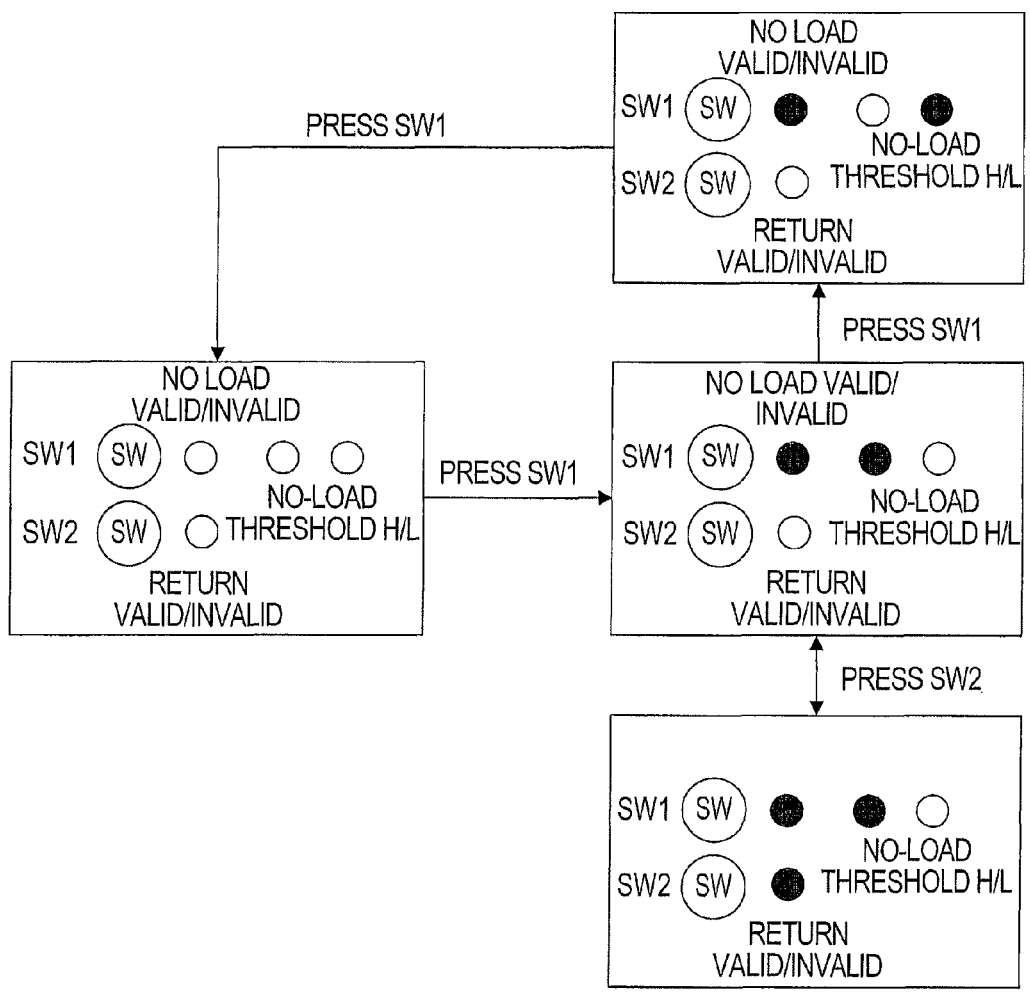
FIG. 14 is an explanatory diagram explaining various setting methods using an operation/display panel.

In the initial state, if, for example, the first operation switch 61 is push-operated, the no-load control is set to be valid, and the current range threshold and the number-of-detections threshold are set to be the respective high thresholds, when, as shown in the middle right-hand state diagram (state A) in FIG. 14, the no-load valid/invalid LED 61*a* and the high threshold LED 61*b* are on from among the LEDs on the operation/display panel 53.

If the first operation switch 61 is again push-operated in the state A, the current range threshold and the number-of-detections threshold are switched to the respective low thresholds while the valid setting of the no-load control is maintained, when, as shown in the top right-hand state diagram (state B) in FIG. 14, the no-load valid/invalid LED 61*a* and the low threshold LED 61*c* are on from among the LEDs on the operation/display panel 53.

If the first operation switch 61 is again push-operated in the state B, the no-load control is set to be invalid. In other words, the initial state is recovered to turn off all the LEDs.

If the second operation switch 62 is push-operated in the state A, the return from a no-load release state to a no-load control state during no-load control (the return from the high speed drive under load to the low speed drive under no load) is further set to be valid while the valid setting of the no-load control and the setting to the high thresholds are both maintained. This means the same state as in which the no-load return valid request is transmitted from the mobile communication terminal 30 in the first embodiment. At this time, as shown in the bottom right-hand state diagram (state C) in FIG. 14, the no-load valid/invalid LED 61*a*, the high threshold LED 61*b*, and the return valid/invalid LED 62 are on from among the LEDs on the operation/display panel 53.

If the second operation switch 62 is again push-operated in the state C, the return from the no-load release state to the no-load control state is set to be invalid to thereby switch the state to the state B.

Also in the present embodiment, the MCU 52 of the electric power tool 50 executes the main process in FIG. 5. However, in the present embodiment, S150 in the main process shown in FIG. 5 is a process for receiving an operation input via the operation/display panel 53. Also in the present embodiment, S200 in the motor control process shown in FIG. 6 is an operation input reflection process for reflecting a result inputted via the operation/display panel 53. The details of the operation input reflection process are as shown in FIG. 15.

Figure 15:
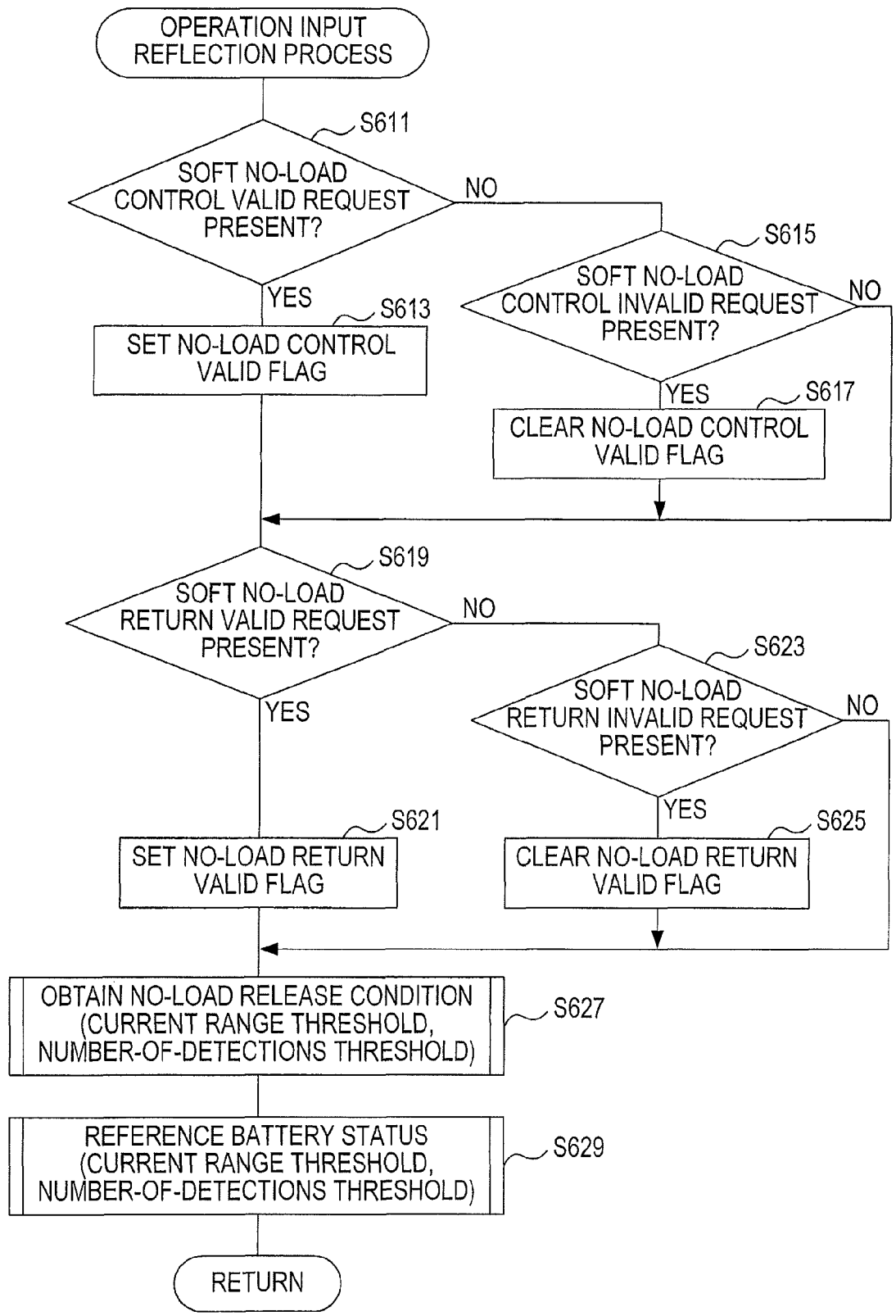
FIG. 15 is a flowchart showing an operation input reflection process.

In the operation input reflection process shown in FIG. 15, since the processes of S611 to S625 are identical with the processes of S211 to S225 in the external device setting reflection process shown in FIG. 7, the description thereof will be omitted herefrom.

In the operation input reflection process shown in FIG. 15, the MCU 52 obtains, in S627, a no-load release condition, i.e., the current range threshold and the number-of-detections threshold. Specifically, information is obtained as to which of the high threshold or the low threshold each of the thresholds is set to be, based on the contents inputted via the operation/display panel 53. If the thresholds are set to be neither the high threshold nor the low threshold, i.e., if the no-load control is set to be invalid, the process proceeds to the subsequent S629 without substantially executing the process of S627.

In S629, the status of the battery is referenced for the current range threshold and the number-of-detections threshold obtained in S627. That is, as in S231 in FIG. 7, the thresholds are each corrected according to the voltage of the battery 3.

Working effects equivalent to those of the electric power tool 1 of the first embodiment can be obtained also from the electric power tool 50 of the present embodiment as described above.

In the present embodiment in particular, some setting items and parameters can be set as appropriate by operation of the operation/display panel 53 arranged on the tool body 2. That is, without the mobile communication terminal 30 described in the first embodiment, the electric power tool 50 alone can set the above setting items and parameters to be desired values.

In the present embodiment, the operation/display panel 53 is an example of the operation input receiving unit (the threshold setting input unit, the number-of-rotations setting input unit, and the selection input receiving unit) of the present invention, and the first operation switch 61 and the second operation switch 62 are examples of the operation unit of the present invention.

Other Embodiments (1) The method of detecting the loaded state based on the current range is a mere example, and the loaded state may be detected based on the fluctuation range of a state amount other than the current that directly or indirectly indicates an operational state of the motor 9.

For example, the detection of the loaded state can be performed based on the fluctuation range of the actual number of rotations of the motor 9, the voltage applied to the motor 9, the battery voltage, the duty ratio command value under the feedback control, or the like.

The detection of a change from the loaded state to the unloaded state may also be performed based on a state amount other than the current and the current amplitude.

(2) The number of rotations of the motor 9 may continuously or gradually be set by a device other than the trigger 7, for example, by dial operation. In a case where a dial is provided, the configuration may be devised such that the number of rotations during no-load operation and the number of rotations during no-load release also change according to the operational position of the dial.

(3) The current range threshold (S355 in FIG. 9) used for the load detection and the current range threshold (S377 in FIG. 10) used for the no-load detection may be separately settable. The number-of-detections threshold (S361 in FIG. 9) used for the load detection and the number-of-detections threshold (S380 in FIG. 10) used for the no-load detection may also be separately settable. In the no-load release determination process shown in FIG. 9, the prescribed time period for the small-current-amplitude counter (S358) and the prescribed time period for the no-current-amplitude counter (S360) may be the same with or different from each other.

(4) In the no-load release determination process shown in FIG. 9, it may be determined in S352 that the current amplitude is not present only if there is no fluctuation at all in the current. However, even if there is a slight fluctuation that can be regarded as substantially none (in terms of the working effects of the present invention), it may be determined that there is no current amplitude. For example, an upper limit of the amplitude that can be regarded as no fluctuation may be set as a threshold (corresponding to the no-fluctuation threshold), to thereby determine that the current amplitude is not present if the current amplitude is equal to or smaller than the threshold.

(5) The external device for performing various settings to the electric power tool is not limited to the mobile communication terminal 30. The communication with the external device is not limited to wireless communication but may be wire communication.

(6) The above embodiments describe that the MCU of the electric power tool is formed of a microcomputer. However, the MCU may be formed of, for example, an ASIC, a FPGA, other various ICs, logic circuits, or the like as well as of a microcomputer.

(7) Although the motor 9 according to the above embodiments is a brushed DC motor, the present invention can be applied to a motor-driven appliance having a motor other than a brushed DC motor (e.g., a brushless motor, various AC motors, or the like).

(8) Although the above embodiments give examples of application of the present invention to an electric power tool (specifically a jigsaw), the present invention can be applied not only to an electric power tool but also to any kind of motor-driven appliance. For example, the present invention can also be applied to a reciprocating saw, which can cut a workpiece by reciprocatingly driving a blade by a motor just like a jigsaw. Also, the application of the present invention is not limited to a motor-driven appliance such as a jigsaw or a reciprocating saw that is configured to reciprocatingly drive an appliance element.

What is claimed is:

1. A motor-driven appliance comprising:
   a motor; and
   a control unit that is configured to control a drive output to the motor, the control unit comprising:
      a state amount detection unit that is configured to detect a state amount indicating an operational state of the motor;
      a fluctuation range derivation unit that is configured to derive a fluctuation range of fluctuation in the state amount, based on the state amount detected by the state amount detection unit, the fluctuation range derivation unit being configured to derive the fluctuation range as (i) a difference between a maximum value of the state amount and a minimum value of the state amount in a decreasing section where the state amount decreases or (ii) a difference between the maximum value of the state amount and the minimum value of the state amount in an increasing section where the state amount increases;
      a load presence/absence detection unit that is configured to detect whether the motor is in an unloaded state or in a loaded state, based on the fluctuation range derived by the fluctuation range derivation unit; and
      a drive output unit that is configured to perform the drive output to the motor, based on the state detected by the load presence/absence detection unit.

2. The motor-driven appliance according to claim 1, wherein the drive output unit is configured to perform the drive output to the motor so that a number of rotations of the motor is larger in the loaded state than in the unloaded state, based on the state detected by the load presence/absence detection unit.

3. The motor-driven appliance according to claim 1, wherein the control unit comprises:
   a fluctuation occurrence determination unit that is configured to determine, at each predetermined determination timing, whether the fluctuation range derived by the fluctuation range derivation unit is equal to or larger than a predetermined fluctuation occurrence detection threshold;

a number-of-fluctuation-detections counting unit that is configured to count a number of fluctuation detections, which is a number of times the fluctuation range is determined by the fluctuation occurrence determination unit to be equal to or larger than the fluctuation occurrence detection threshold; and a number-of-fluctuation-detections determination unit that is configured to determine whether the number of fluctuation detections counted by the number-of-fluctuation-detections counting unit is equal to or larger than a predetermined number-of-fluctuation-detections threshold, and wherein the load presence/absence detection unit is configured to determine that the motor has been brought into the loaded state if the number of fluctuation detections is determined by the number-of-fluctuation-detections determination unit to be equal to or larger than the number-of-fluctuation-detections threshold.

4. The motor-driven appliance according to claim 3, wherein the control unit comprises a number-of-fluctuation-detections initialization unit that is configured to initialize the number of fluctuation detections counted by the number-of-fluctuation-detections counting unit to an initial value if a state in which the fluctuation range is not determined by the fluctuation occurrence determination unit to be equal to or larger than the fluctuation occurrence detection threshold has continued for a predetermined first determination time period.

5. The motor-driven appliance according to claim 3, comprising a threshold setting input unit that is configured to receive a setting input of at least either the fluctuation occurrence detection threshold or the number-of-fluctuation-detections threshold, wherein the control unit comprises a threshold setting unit that is configured to set the at least either the fluctuation occurrence detection threshold or the number-of-fluctuation-detections threshold inputted by the threshold setting input unit as a setting input value.

6. The motor-driven appliance according to claim 5, wherein the threshold setting input unit comprises at least either an operation input receiving unit that is configured to receive the setting input by operation input to an operation unit provided in the motor-driven appliance or a communication input receiving unit that is configured to receive the setting input by communication from an external device.

7. The motor-driven appliance according to claim 3, comprising:
a battery that is configured to supply electric power to the motor; and
a voltage detection unit that is configured to detect a voltage of the battery,
wherein the control unit comprises a threshold change unit that is configured to change the at least either the fluctuation occurrence detection threshold or the number-of-fluctuation-detections threshold, based on the voltage of the battery detected by the voltage detection unit.

8. The motor-driven appliance according to claim 1, wherein the load presence/absence detection unit is configured to determine that the motor has been brought into the loaded state if a state in which the fluctuation range derived by the fluctuation range derivation unit is equal to or smaller than a predetermined no-fluctuation threshold indicating no fluctuation in the state amount has continued for a predetermined second determination time period.

9. The motor-driven appliance according to claim 1, wherein the drive output unit is configured to perform, in the unloaded state, a drive output under no load for rotating the motor at a predetermined number of rotations under no load; and to perform, in the loaded state, a drive output under load for rotating the motor at a predetermined number of rotations under load that is larger than the number of rotations under no load.

10. The motor-driven appliance according to claim 9, comprising a number-of-rotations setting input unit that is configured to receive a setting input of at least either the number of rotations under no load or the number of rotations under load, wherein the control unit comprises a number-of-rotations setting unit that is configured to set the at least either the number of rotations under no load or the number of rotations under load inputted by the number-of-rotations setting input unit as a setting input value.

11. The motor-driven appliance according to claim 10, wherein the number-of-rotations setting input unit comprises at least either an operation input receiving unit that is configured to receive the setting input by operation input to an operation unit provided in the motor-driven appliance or a communication input receiving unit that is configured to receive the setting input by communication from an external device.

12. The motor-driven appliance according to claim 9, comprising a selection input receiving unit that is configured to receive, in a case where a change to the unloaded state is detected after a change from the unloaded state to the loaded state has been detected by the load presence/absence detection unit, a selection input as to whether the drive output to the motor by the drive output unit is to be changed from the drive output under load to the drive output under no load, or the drive output under load is to be maintained as it is, wherein the drive output unit is configured to perform, in a case where a change to the unloaded state is detected after a change from the unloaded state to the loaded state has been detected by the load presence/absence detection unit, the drive output to the motor according to input received by the selection input receiving unit.

13. The motor-driven appliance according to claim 12, wherein the selection input receiving unit comprises at least either an operation input receiving unit that is configured to receive the selection input by operation input to an operation unit provided in the motor-driven appliance or a communication input receiving unit that is configured to receive the selection input by communication from an external device.

14. The motor-driven appliance according to claim 1,
wherein the state amount detection unit is configured to detect a current flowing in the motor as the state amount, and
wherein the fluctuation range derivation unit is configured to derive an amplitude of the current detected by the state amount detection unit as the fluctuation range.

15. The motor-driven appliance according to claim 1, comprising:
an appliance element; and
a drive mechanism that is configured to reciprocatingly drive the appliance element by converting a rotation of the motor to a reciprocating movement and transmitting the reciprocating movement to the appliance element,
wherein the appliance element driven reciprocatingly is configured to be brought into contact with a workpiece to thereby enable processing of the workpiece.

16. A motor-driven appliance comprising:
a motor; and
a control unit that is configured to control a drive output to the motor, the control unit comprising:

a state amount detection unit that is configured to detect a state amount indicating an operational state of the motor;

a fluctuation range derivation unit that is configured to derive a fluctuation range of fluctuation in the state amount, based on the state amount detected by the state amount detection unit;

a load presence/absence detection unit that is configured to detect whether the motor is in an unloaded state or in a loaded state, based on the fluctuation range derived by the fluctuation range derivation unit; and a drive output unit that is configured to perform the drive output to the motor, based on the state detected by the load presence/absence detection unit, wherein the control unit comprises:

a fluctuation occurrence determination unit that is configured to determine, at each predetermined determination timing, whether the fluctuation range derived by the fluctuation range derivation unit is equal to or larger than a predetermined fluctuation occurrence detection threshold;

a number-of-fluctuation-detections counting unit that is configured to count a number of fluctuation detections, which is a number of times the fluctuation range is determined by the fluctuation occurrence determination unit to be equal to or larger than the fluctuation occurrence detection threshold; and a number-of-fluctuation-detections determination unit that is configured to determine whether the number of fluctuation detections counted by the number-of-fluctuation-detections counting unit is equal to or larger than a predetermined number-of-fluctuation-detections threshold, and wherein the load presence/absence detection unit is configured to determine that the motor has been brought into the loaded state if the number of fluctuation detections is determined by the number-of-fluctuation-detections determination unit to be equal to or larger than the number-of-fluctuation-detections threshold.

17. The motor-driven appliance according to claim 16, wherein the drive output unit is configured to perform the drive output to the motor so that a number of rotations of the motor is larger in the loaded state than in the unloaded state, based on the state detected by the load presence/absence detection unit.

* * * * *